US008067521B2

(12) United States Patent
Kennedy et al.

(10) Patent No.: US 8,067,521 B2
(45) Date of Patent: *Nov. 29, 2011

(54) AMPHIPHILIC CO-NETWORKS, FILMS MADE FROM AMPHIPHILIC CO-NETWORKS AND USES FOR SUCH CO-NETWORKS AND FILMS

(75) Inventors: Joseph P. Kennedy, Akron, OH (US); Gabor Erdodi, Stow, OH (US)

(73) Assignee: The University of Akron, Akron, OH (US)

( * ) Notice: Subject to any disclaimer, the term of this patent is extended or adjusted under 35 U.S.C. 154(b) by 909 days.

This patent is subject to a terminal disclaimer.

(21) Appl. No.: 11/572,826

(22) PCT Filed: Jul. 28, 2005

(86) PCT No.: PCT/US2005/027163
§ 371 (c)(1),
(2), (4) Date: Oct. 2, 2007

(87) PCT Pub. No.: WO2006/073499
PCT Pub. Date: Jul. 13, 2006

(65) Prior Publication Data
US 2008/0051513 A1 Feb. 28, 2008

Related U.S. Application Data

(60) Provisional application No. 60/592,478, filed on Jul. 30, 2004.

(51) Int. Cl.
C08G 77/08 (2006.01)
(52) U.S. Cl. .................. 528/29; 528/31; 528/32
(58) Field of Classification Search .......... 528/31, 528/32, 29
See application file for complete search history.

(56) References Cited

U.S. PATENT DOCUMENTS

| 6,005,051 A | 12/1999 | Kennedy et al. | |
| 6,528,584 B2 * | 3/2003 | Kennedy et al. | 525/101 |
| 7,642,332 B2 * | 1/2010 | Kennedy et al. | 528/31 |
| 2003/0022991 A1 | 1/2003 | Kennedy | |

FOREIGN PATENT DOCUMENTS

| EP | 0307098 A2 | 3/1989 |
| EP | 0314315 A2 | 5/1989 |
| EP | 0992252 A | 4/2000 |
| WO | WO 97/49740 | 12/1997 |
| WO | WO 99/17917 | 4/1999 |

OTHER PUBLICATIONS

Kurian, P. et al: "Synthesis, permeability and biocompatibiltiy of tricomponent membranes containing polyethylene glycol, polydimethylsiloxane and polypentamethylcyclopentasiloxane domains", Biomaterials, Elsevier Science Publishers, BV., Barking, GB, vol. 24, No. 20, Sep. 1, 2003, pp. 3493-3503, XP004429643, ISSN: 0142-9312 *abstract Scheme 1*.
I.S. Isayeva, et al: "Amphiphilic Membrances Crosslinked and Reinforced by POSS", J. Polymer Science Part A: Polym. Chem., vol. 42, Sep. 1, 2004, pp. 4337-4352, XP002536593 abstract figures 1,7*.
Erdodi, Gabor et al., Ideal Tetrafunctional Amphiphilic PEG/PDMS Conetworks by a . . . , Journal of Polymer Science: Part A; Polymer Chemistry, 2005, pp. 4953-4964, vol. 43.
Erdodi, Gabor et al., Ideal Tetrafunctional Amphiphilic PEG/PDMS Conetworks by a . . . , Journal of Polymer Science: Part A; Polymer Chemistry, 2005, pp. 4965-4971, vol. 43.
Nakagawa, Tsutomu et al., Morphology and gas permeability in copolyimides containing polydimethylsiloxane block, Journal of Membrane Science 206, 2002, pp. 149-163.
Fonagy, Tamas et al., Polyisobutylene-graft-polystyrene by quasiliving atom transfer radical polymerization of . . . , Macromol. Rapid Commun. 19, 1998, pp. 479-483, No. 9.
Puskas, Judit E. et al., Synthesis and Characterization of Novel Dendritic . . . , Journal of Polymer Science: Part A: Polymer Chemistry, 2005, pp. 1811-1826, vol. 43.
Erodoi, Gabor et al., Novel Amphiphilic Conetworkds Composed of Telechelic Poly (ethylene oxide) and Three-Arm Star Polyisobutylene, Chem. Mater., 2004, pp. 959-962.
Nicolson, Paul C. et al., Soft contact lens polymers: an evolution, Biomaterials 22, 2001, pp. 3273-3283.
Matsumotok, Takeo et al., Novel Functional Polymers, PDMS-Aramid Multiblock Copolymer VII, pp. 1153-1159.
Veenstra, Harm et al., On the coarsening of co-continuous morphologies in polymer blends: effect of interfacial tension, viscosity and . . . , Polymer 41, 2000, pp. 3037-3045.
Kunzler, J. et al., Methacrylate-Capped fluoro Side Chain Siloxanes: Synthesis, Characterization, and Their Use in the Design . . . , John Wiley & Sons, Inc., 1997, pp. 1081-1089.
Gudipati, Chakravarthy S. et al., Hyperbranched fluoropolymer and Linear . . . , Journal of Polymer Science: Part A: Polymer Chemistry, 2004, pp. 6193-6208, vol. 42.
Vamvakaki, Maria et al., Synthesis and Characterization of Electrolytic Amphiphilic Model Networks Based on Cross-Linked Star . . . , Chem. Mater., 2002, pp. 1630-1638, 14.
Christova, Darinka et al., Amphiphilic segmented polymer networks based on poly (2-alkyl-2-oxazoline) and poly(methyl methacrylate), Polymer 43, 2002, pp. 4585-4590.
Domjan, Attila et al., Structural Studies of Nanophase-Separated Poly(2-hydroxyethyl methacrylate)-1-polyisobutylene Amphiphilic . . . , Macromolecules, 2003, pp. 9107-9114, 36.
Bruns, Nico et al., Nanophase Separated Amphiphilic Conetwork Coatings and Membranes, Macromolecules, 2005, pp. 2431-2438, 38.

(Continued)

Primary Examiner — Margaret Moore
(74) Attorney, Agent, or Firm — Renner, Kenner, Greive, Bobak, Taylor & Weber

(57) ABSTRACT

The present invention relates to the production of amphiphilic copolymer networks or co-networks that are both hydrophobic and hydrophilic, the copolymer networks comprise polyalkylene glycol segments and disubstituted polysiloxane segments. Furthermore, the present invention relates to products and/or films made from the amphiphilic copolymer networks or co-networks produced in accordance with the synthesis methods of the present invention. In one embodiment, amphiphilic networks or co-networks are synthesized using functional multiblock co-polymers according to the formula $(AY)_x(BY)_y$, where A represents an alkylene glycol polymer having n repeating alkylene glycol units, B represents a disubstituted siloxane polymer having m repeating siloxane units, and Y represents a molecule (e.g., a silane) that functions both as a chain extender and a crosslinker.

55 Claims, 12 Drawing Sheets

OTHER PUBLICATIONS

Kurian, P. et al., Synthesis, permeability and biocompatibility of tricomponent membranes containing polyethylene glycol, . . . , Biomaterials 24, 2003, pp. 3493-3503.

Isayeva, I. S. et al., Characterization and performance of membranes designed for macroencapsulation/implantation of pancreatic islet . . . , Biomaterials 24, 2003, pp. 3483-3491.

Isayeva, Rada S. et al., Amphiphilic Membranes Crosslinked and Reinforced by POSS, Journal of Polymer Science: Part A: Polymer Chemistry, 2004, pp. 4337-4352, vol. 42.

Kurian, Pious et al., Novel Tricomponent Membranes Containing Poly(ethylen glycol)/ . . . , Journal of Polymer Science: Part A: Polymer Chemistry, 2002, pp. 3093-3102, vol. 40.

Haraszti, Marton et al., Smart Poly(Methacrylic acid)-1-Polyisobutylene Polyelectrolyte Amphiphilic Conetworks, Polym Prep, 2004, pp. 259-260, 45.

Kurian, Pious et al., Novel Cyclosiloxane-Based Networks, Polym Prep, 2003, pp. 33-34, 44.

He, Chunju et al., Individual and Simultaneous Swelling of Amphiphilic Conetworks in . . . , Journal of Polymer Science: Part B: Polymer Physics, 2006, pp. 1474-1481, vol. 44.

Standard Test Method for Time-to-Failure of Plastic Pipe Under Constant Internal Pressure, ASTM D1598-97, annual Book of ASTM Standards, 1999, pp. 23-26, 08.04.

Bougherara, Chaabane et al., Synthesis of a-w unsaturated oligomers by chemical modification of dihydroxylated compounds, Polymer Bulletin 26, 1991, pp. 181-185.

Nowak, C. et al., Rod-coil multiblock copolymers: Structure and stability, Europhys. Lett., 2004, pp. 44-50, 68 (1).

Optics and optical instruments-Contact lenses-Part 1: Determination of oxygen permeability and transmissiblilty by the FATT method, International Standard ISO 9913-1:1996(E).

David, Ghislain et al., Synthesis of Thermoplastic Elastomer Based on Polystyrene Polydimethylsiloxane Block Copolymers, Polym. Prep, 2002, pp. 1095-1096, 43.

Christova, Darinka et al., Glutaraldehyde-crosslinked poly(glycidol-block-ethylene oxide-block-glycidol) networks with . . . , e-Polymers, 2003, pp. 1-11, No. 042.

* cited by examiner

AMPHIPHILIC CO-NETWORKS, FILMS MADE FROM AMPHIPHILIC CO-NETWORKS AND USES FOR SUCH CO-NETWORKS AND FILMS

The present invention was made in the course of research that was supported by National Science Foundation (NSF) Grant DMR 02-43314. The United States government may have certain rights to the invention or inventions herein.

FIELD OF THE INVENTION

The present invention relates to the production of amphiphilic copolymer networks or co-networks that are both hydrophobic and hydrophilic, the copolymer networks comprise polyalkylene glycol segments and disubstituted polysiloxane segments. Furthermore, the present invention relates to products and/or films made from the amphiphilic copolymer networks or co-networks produced in accordance with the synthesis methods of the present invention. In one embodiment, amphiphilic networks or co-networks are synthesized using functional multiblock co-polymers according to the formula $(AY)_x(BY)_y$, where A represents an alkylene glycol polymer having n repeating alkylene glycol units, B represents a disubstituted siloxane polymer having m repeating siloxane units, and Y represents a molecule (e.g., a silane) that functions both as a chain extender and a crosslinker.

BACKGROUND OF THE INVENTION

Many medical deficiencies and diseases result from the inability of cells to produce normal biologically active moieties. Many of these deficiencies can be remedied by implanting the needed biologically active moieties or pharmacological agents into the individual having the deficiency. A well known disease that can be remedied by implanting biological material or a pharmacological agent is Type I diabetes mellitus, wherein the production of insulin by pancreatic Langerhans islet cells is substantially deficient, impaired, or nonexistent.

Encapsulating human islet cells or tissues within a biologically compatible device followed by implanting the device into a host individual has been proposed as a means for providing insulin to an individual with Type I diabetes. However, an individual's immune response frequently attacks foreign biological material such as cells, tissues, and organs. And the response severely limits the effectiveness of methods that involve implanting foreign biological material.

Porcine pancreatic islet cells can produce insulin, and their supply is much greater than that of human pancreatic islet cells. Therefore, transplanting porcine islet cells, if effectively immunoisolated from the normal immunological response of a human, would be of great benefit to a vast number of individuals with type I diabetes.

Amphiphilic polymer networks can serve as a means to encapsulate and thereby immunoisolate implantable biologically active moieties. An amphiphilic polymer network comprises hydrophilic and hydrophobic monomers and polymers that can swell in both polar and non-polar solvents.

Additionally, amphiphilic networks can be used to produce polymer films that swell in both polar and non-polar solvents. Accordingly, films made from amphiphilic polymer networks have been found to be desirable in the production of contact lenses.

One problem associated with the synthesis of amphiphilic co-networks is how to overcome the thermodynamic incompatibility of the hydrophilic and hydrophobic constituents that will make up the amphiphilic co-network, and to unite two incompatible pre-polymers and/or polymers into a bicontinuous/bipercolating construct. Typically, crosslinking of such systems is carried out in homogeneous solution in a common good solvent at low pre-polymer and/or polymer concentrations, followed by the addition of a suitable crosslinker (i.e., by dissolving the two pre-polymers which are generally incompatible in their dry states). While this method yields uniform co-networks, the removal of the common solvent is accompanied by massive shrinkage, which renders the method technically impractical. Also, the dimensional stability of such co-networks is poor, the surface properties are hard to control, and the co-networks (or products formed therefrom) are fragile and difficult to manipulate.

Thus, there is a need in the art for reliable synthesis routes for amphiphilic co-networks. Specifically, desirable synthesis routes would include those that permit the control of one or more chemical and/or physical properties of amphiphilic co-networks. Also of interest are synthesis routes for amphiphilic co-networks that produce amphiphilic co-networks that are suitable for use in medical (e.g., cell encapsulation), biological and ophthalmic uses.

SUMMARY OF THE INVENTION

The present invention relates to the production of amphiphilic copolymer networks or co-networks that are both hydrophobic and hydrophilic, the copolymer networks comprise polyalkylene glycol segments and disubstituted polysiloxane segments. Furthermore, the present invention relates to products and/or films made from the amphiphilic copolymer networks or co-networks produced in accordance with the synthesis methods of the present invention. In one embodiment, amphiphilic networks or co-networks are synthesized using functional multiblock co-polymers according to the formula $(AY)_x(BY)_y$, where A represents an alkylene glycol polymer having n repeating alkylene glycol units, B represents a disubstituted siloxane polymer having m repeating siloxane units, and Y represents a molecule (e.g., a silane) that functions both as a chain extender and a crosslinker.

In one embodiment, the present invention relates to a multicomponent network comprising the reaction product of at least one hydrophilic polymer, at least one hydrophobic polymer and at least one silane compound, wherein the silane compound can act as both: (1) a chain extender and coupler for the combination of the at least one hydrophilic polymer and the at least one hydrophobic polymer, and (2) as a crosslinking agent compound.

In another embodiment, the present invention relates to a multicomponent network comprising the reaction product of at least one polyethylene glycol polymer, at least one polydimethylsiloxane polymer and at least one silane compound, wherein the silane compound can act as both: (1) a chain extender and coupler for the combination of the at least one polyethylene glycol polymer and the at least one polydimethylsiloxane polymer, and (2) as a crosslinking agent compound.

In yet another embodiment, the present invention relates to a multicomponent network comprising the reaction product of at least one styryl-ditelechelic polyethylene glycol polymer, at least one vinyl ditelechelic polydimethylsiloxane polymer and at least one silane compound according to Formula (I):

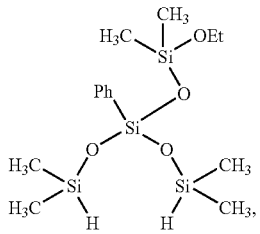

(I)

wherein the silane compound according to Formula (I) can act as both: (1) a chain extender and coupler for the combination of the at least one polyethylene glycol polymer and the at least one polydimethylsiloxane polymer, and (2) as a crosslinking agent compound.

In still another embodiment, the present invention relates to an amphiphilic copolymer network swellable in water and/or n-heptane but insoluble in either, the amphiphilic copolymer network comprising the reaction product of a styryl-ditelechelic polyethylene glycol polymer, a vinyl ditelechelic polydimethylsiloxane polymer and a silane compound according to Formula (I):

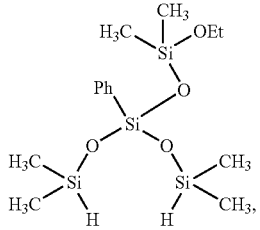

(I)

wherein the silane compound according to Formula (I) can act as both: (1) a chain extender and coupler for the combination of the at least one polyethylene glycol polymer and the at least one polydimethylsiloxane polymer, and (2) as a crosslinking agent compound.

In still another embodiment, the present invention relates to an amphiphilic network comprising the reaction product of at least one hydrophilic polymer or pre-polymer, at least one hydrophobic polymer or pre-polymer, and at least one silane compound according to Formula (I)

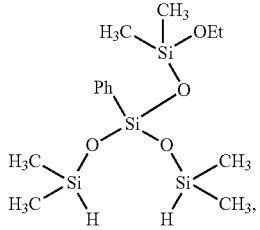

(I)

wherein the silane compound of Formula (I) acts as both: (1) a chain extender and coupler for the combination of the at least one hydrophilic pre-polymer or polymer and the at least one hydrophobic pre-polymer or polymer, and (2) as a crosslinking agent compound.

In still another embodiment, the present invention relates to a method for producing a functional multiblock copolymer according to the formula $(AY)_x(BY)_y$, the method comprising the steps of: (A) combining suitable amounts of an alkylene glycol polymer, a disubstituted siloxane polymer, and a silane chain extending/crosslinking compound; (B) subjecting the mixture formed in Step (A) to reaction conditions suitable to cause cohydrosilation; and (C) extracting the reaction product formed in Step (B) to yield a functional multiblock copolymer, where A represents the alkylene glycol polymer, B represents the disubstituted siloxane polymer, and Y represents the silane compound, and where Y can function as both a chain extender and a crosslinker.

In still another embodiment, the present invention relates to a method for producing an amphiphilic network, the method comprising the steps of: (a) combining suitable amounts of at least one functional multiblock copolymer according to the formula $(AY)_x(BY)_y$, where A represents an alkylene glycol polymer, B represents a disubstituted siloxane polymer, and Y represents a silane compound that functions as both a chain extender and a crosslinker, with at least one acid; (b) subjecting the mixture formed in Step (a) to reaction conditions suitable to cause crosslinking of the one or more functional multiblock copolymers via compound Y; and (c) extracting the reaction product formed in Step (b) to yield an amphiphilic network.

In still another embodiment, the present invention relates to a multiblock copolymer comprising a combination of at least one hydrophilic polymer, at least one hydrophobic polymer and at least one silane compound, wherein the silane compound can act as both: (1) a chain extender and coupler for the combination of the at least one hydrophilic polymer and the at least one hydrophobic polymer, and (2) as a crosslinking agent compound.

In still another embodiment, the present invention relates to an amphiphilic co-network comprising: hydrophilic polymer segments formed from at least one hydrophilic polymer containing compound; hydrophobic polymer segments formed from at least one hydrophobic polymer containing compound; and at least one silane compound, wherein the silane compound acts as both: (1) a chain extender and coupler for the combination of the at least one hydrophilic polymer, and (2) the at least one hydrophobic polymer and as a crosslinking agent compound.

DESCRIPTION OF THE INVENTION

The present invention relates to the production of amphiphilic copolymer networks or co-networks that are both hydrophobic and hydrophilic, the copolymer networks comprise polyalkylene glycol segments and disubstituted polysiloxane segments. Furthermore, the present invention relates to products and/or films made from the amphiphilic copolymer networks or co-networks produced in accordance with the synthesis methods of the present invention. In one embodiment, amphiphilic networks or co-networks are synthesized using functional multiblock co-polymers according to the formula $(AY)_x(BY)_y$, where A represents an alkylene glycol polymer having n repeating alkylene glycol units, B represents a disubstituted siloxane polymer having m repeating siloxane units, and Y represents a molecule (e.g., a silane) that functions both as a chain extender and a crosslinker.

In another embodiment, the present invention relates to the synthesis of an amphiphilic co-network comprising at least one hydrophilic segment and at least one hydrophobic segment. In one embodiment, the hydrophilic segments include at least one polyalkylene glycol (e.g., polyethylene glycol (PEG)) and the hydrophobic segments include at least one disubstituted polysiloxane (e.g., polydimethylsiloxane (PDMS)).

In one embodiment, co-networks in accordance with the present invention are ideal (i.e., the lengths of each hydrophilic segments and the hydrophobic segments are identical). In another embodiment, the co-networks synthesized in accordance with the present invention do not have to be ideal. That is, if so desired, the hydrophilic segments and the hydrophobic segments can have different lengths.

Figure 1:
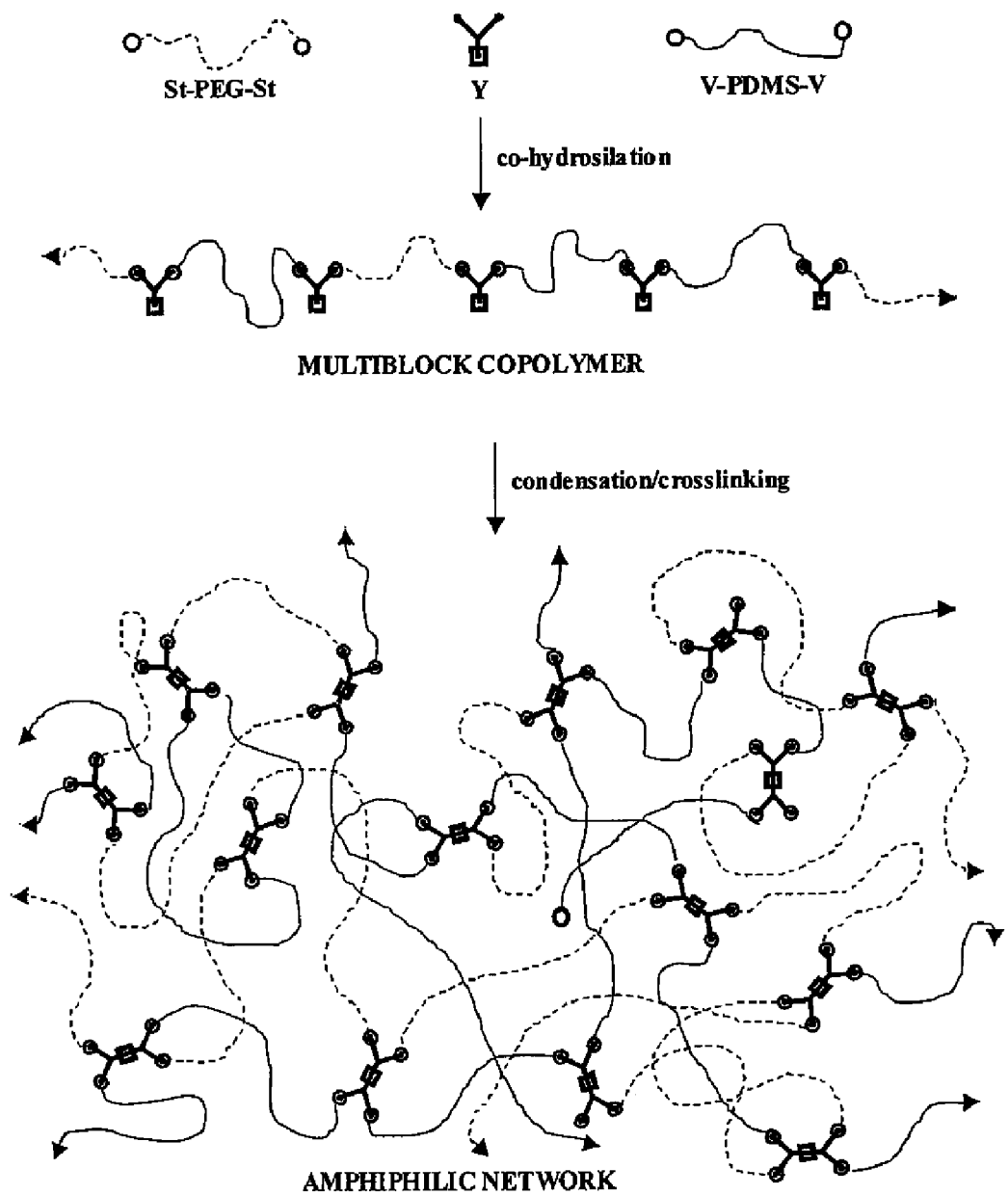
FIG. 1 illustrates a strategy for the synthesis of bi-continuous amphiphilic networks/co-networks in accordance with one embodiment of the present invention.

As is discussed above, the present invention relates to amphiphilic co-networks that contain therein a molecule Y that acts as both a chain extender and a crosslinker. In one embodiment, Y is at least a tri-functional molecule. In another embodiment, Y is a tetra-functional molecule. As can be seen in FIG. 1, the bottom of the Y molecule binds to another Y molecule bottom during a crosslinking reaction to yield amphiphilic co-networks in accordance with the present invention. In one instance, during the crosslinking reaction two Y molecules combine to yield a tetra-functional crosslinking/chain extending molecule.

In one embodiment, Y is a tri-functional silane. Although not limited thereto, Y can be a silane according to the Formula (I) shown below:

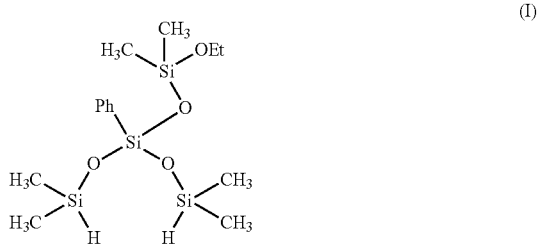

(I)

As would be apparent to one of ordinary skill in the art, Y is shown minus the polymer chains to which it binds. As will be explained below, Y binds to two polymer chains thereby acting as a chain extending agent. During the crosslinking reaction, two Y molecules link to form the aforementioned crosslinks and yield the following tetra-functional sub-molecule

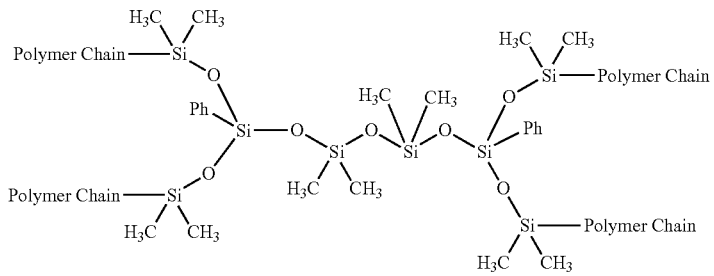

The words "Polymer Chain" denote bonds that are formed with a suitable hydrophilic polymer (denoted by A in the above-mentioned generic formula) or a suitable hydrophobic polymer (denoted by B in the above-mentioned generic formula). The chain extension bonds are formed via a one to one reaction between a terminal end of a polymer chain with each of the hydrogens in the silane according to Formula (I). The two chain extending Y molecules are then crosslinked via each Y molecule's ethoxy group to yield the above tetra-functional chain extender/crosslinker.

It will be appreciated by those of ordinary skill in the art that the present invention can utilize other molecules that can function both as a chain extender and a crosslinker. All that is required for a compound to be used as molecule Y is that the compound fulfills at least the above two functions. First, the compound that is chosen to function as molecule Y must be able to extend the incompatible hydrophilic and hydrophobic polymers used to form the functional multiblock copolymers of the present invention according to the formula $(AY)_x(BY)_y$. Second, the compound that is chosen to function as molecule Y must be able to subsequently crosslink the polymer blocks of the multiblock copolymers according to the formula $(AY)_x(BY)_y$ thereby yielding an amphiphilic network/co-network.

As noted above, one problem associated with the synthesis of amphiphilic co-networks is how to overcome the thermodynamic incompatibility of the hydrophilic and hydrophobic constituents, and to unite two incompatible pre-polymers and/or polymers into a bi-continuous/bipercolating construct. Typically, crosslinking of such systems is carried out in homogeneous solution in a common good solvent at low pre-polymer and/or polymer concentrations, followed by the addition of a suitable crosslinker (i.e., by dissolving the two pre-polymers which are generally incompatible in their dry states). While this method yields uniform co-networks, the removal of the common solvent is accompanied by massive shrinkage, which renders the method technically impractical. Also, the dimensional stability of such co-networks is poor, the surface properties are hard to control, and the co-networks (or products formed therefrom) are fragile and difficult to manipulate. Among other things, the present invention provides amphiphilic co-networks that overcome one or more of the above mentioned drawbacks.

The synthesis schemes of the present invention utilize one or more functional multiblock copolymers according to the formula $(AY)_x(BY)_y$, where A represents an alkylene glycol polymer having n repeating alkylene glycol units, B represents a disubstituted siloxane polymer having m repeating siloxane units, and Y represents a silane that functions both as a chain extender and a crosslinker. In one embodiment, the one or more functional multiblock copolymers according to the formula $(AY)_x(BY)_y$ are random multiblock copolymers. The one or more units of the functional multiblock copolymers according to the formula $(AY)_x(BY)_y$ are then crosslinked via two or more of the Y units by intermolecular condensation.

In one embodiment, the present invention initially involves preparing one or more random functional multiblock copolymers according to the formula $(AY)_x(BY)_y$, where A represents an alkylene glycol polymer having n repeating alkylene glycol units, B represents a disubstituted siloxane polymer having m repeating siloxane units, and Y represents a silane that functions both as a chain extender and a crosslinker. In one embodiment, the one or more random functional multiblock copolymers according to the formula $(AY)_x(BY)_y$ are prepared extending telechelic, for example, PEG and PDMS pre-polymers with a suitable chain extender/crosslinker Y. Subsequently, the one or more random functional multiblock copolymers are crosslinked via an acid catalyzed condensation reaction of the Y units. It should be noted, that although one possible crosslink strategy is disclosed herein, the present invention encompasses other crosslinking strategies so long as the crosslinker functions as both a chain extending agent and a crosslinking agent.

Polymers:

As is discussed above, the amphiphilic copolymer networks or co-networks of the present invention contain at least one hydrophobic polymer and at least one hydrophilic that have been bounded together by a suitable chain extending molecule. The chain extending molecule also functions as a crosslinking molecule during the formation of the present invention's amphiphilic networks/co-networks.

In one embodiment, the present invention utilizes a combination of at least one polyalkylene glycol polymer with at least one disubstituted siloxane polymer. The at least one polyalkylene glycol polymer functions as the hydrophilic polymer, while the at least one disubstituted siloxane polymer functions as the hydrophobic polymer. As is noted above, the polymers are used to form the functional multiblock co-polymers according to the formula $(AY)_x(BY)_y$. Each polymer used to form the functional multiblock co-polymers according to the formula $(AY)_x(BY)_y$ independently contain from about 5 to about 5,000 repeating polymer units, or from about 10 to about 2,500 repeating polymer units, or from about 25 to about 1,000 repeating polymer units, or even from about 40 to about 500 repeating polymer units. Here, as well as elsewhere in the specification and claims, individual range limits may be combined.

It should be noted that the present invention is not limited to polymers having the above-mentioned number of repeating units. Instead, the present invention can utilize any suitable combination of hydrophilic and hydrophobic polymers having any number of repeating units so long as the polymers used can form functional multiblock co-polymers according to the formula $(AY)_x(BY)_y$. Another consideration that needs to be taken into account when choosing the polymers used to form the amphiphilic networks/co-networks of the present invention is the intended use for the amphiphilic network/co-network. For example, if the amphiphilic network/co-network is going to be formed into a film to be used as a contact lens, then the polymers used in the present invention should at a minimum yield optically transparent amphiphilic networks/co-networks. As would be apparent to one of ordinary skill in the art, depending upon the desired use for the amphiphilic networks/co-networks of the present invention, one may have to take into consideration a wide variety of physical, chemical and/or mechanical properties of the polymers used to form such networks.

In another embodiment, the present invention utilizes a combination of at least one polyethylene glycol polymer with at least one polydimethylsiloxane polymer. Exemplary polyethylene glycol (styryl-ditelechelic polyethylene glycol (St-PEG-St)) and polydimethylsiloxane polymers (vinyl ditelechelic polydimethylsiloxane (V-PDMS-V)) are shown below in Formulas (II) and (III), respectively.

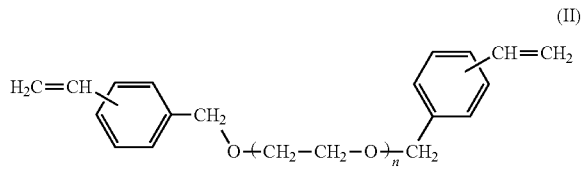

(II)

where n is equal to an integer in the range of about 5 to about 5,000, or from about 10 to about 2,500, or from about 25 to about 1,000, or even from about 40 to about 500, and

(III)

where m is equal to an integer in the range of about 5 to about 5,000, or from about 10 to about 2,500, or from about 25 to about 1,000, or even from about 40 to about 500. It should be noted that the present invention is not limited to just the polyethylene glycol and polydimethylsiloxane polymers of Formulas (II) and (III). Rather, in this embodiment any suitable combination of polyethylene glycol and polydimethylsiloxane polymers can be used.

The polydimethylsiloxane polymer of Formula (III) can, for example, be purchased from Gelest, Tulleytown, Pa. Alternatively, if so desired, the polymer of Formula (III) could be synthesized thereby permitting one to control the number of repeating units present in the polymer of Formula (III).

With regard to the polymer of Formula (II), this polymer can be synthesized by the reaction scheme shown below:

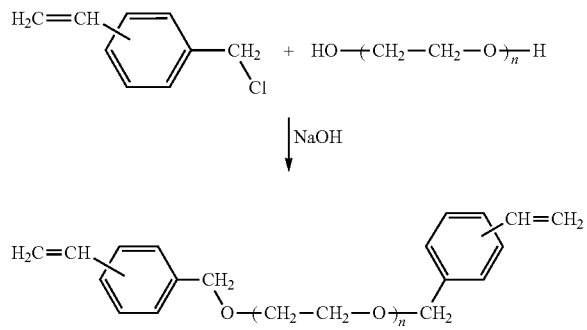

In one instance, 60 grams (0.0013 moles) of hydroxyl ditelechelic polyethylene glycol (HO-PEG-OH having a $M_n$ equal to 4600 grams/mole—available from Aldrich) and 0.032 grams (0.0001 moles) of tetrabutylammonium bromide (Aldrich) are dissolved in 60 grams of toluene (Fisher) at 50° C. Next, 7.8 grams (0.195 moles) of powdered NaOH (Fisher) is added to the above solution. Then, 19.9 grams (0.13 moles) of vinylbenzyl chloride (Aldrich) are added during vigorous stirring of the solution and the temperature is raised to 60° C. After three hours at 60° C. the solution is cooled to room temperature (approximately 25° C.) and 300 grams of methylene chloride (Fisher) is added thereto. The solution is then filtered and extracted with water. The methylene chloride is evaporated therefrom and the product is purified by repeated precipitations from methylene chloride into ether. The product is permitted to dry for one day in vacuum at room temperature and stored at −20° C. under a nitrogen atmosphere. The yield is 45 grams and the product is a faintly yellow powder.

Figure 2:
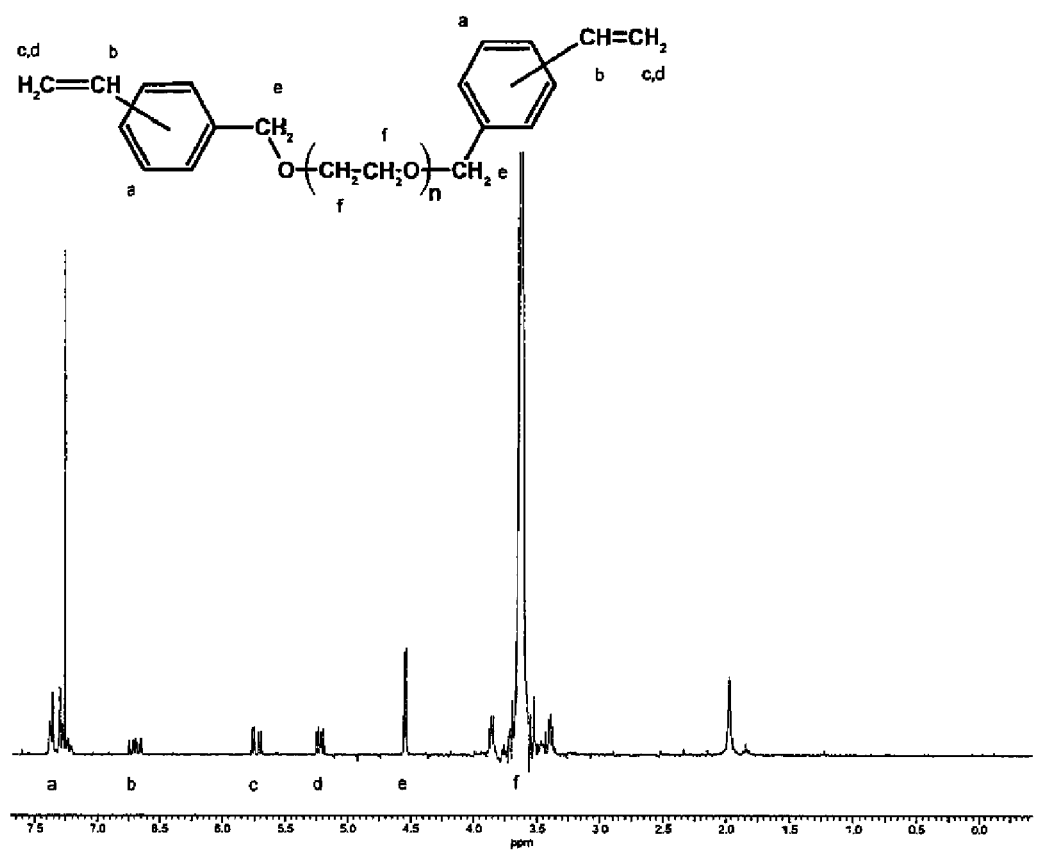
FIG. 2 is a $^1$H NMR spectrum of St-PEG-St.

The product produced by the above reaction is then subjected to $^1$H NMR spectroscopy using a Varian Unity 400-MHz spectrometer with $CDCl_3$ as the solvent in order to confirm that the product is in fact St-PEG-St. FIG. 2 shows the relevant spectra obtained from the $^1$H NMR spectroscopy.

In the above embodiment, styryl-ditelechelic PEG is chosen as the hydrophilic polymer over allyl-telechelic PEG in order to avoid the unwanted isomerization of $CH_2$=CH—$CH_2$— end groups to $CH_3$—CH=CH— during hydrosilation reaction that is used to form functional multiblock copolymers according to the formula $(AY)_x(BY)_y$. As is detailed above, this polymer can be readily obtained from inexpensive commercially available starting materials, i.e., HO-PEG-OH and vinylbenzyl chloride.

Figure 3:
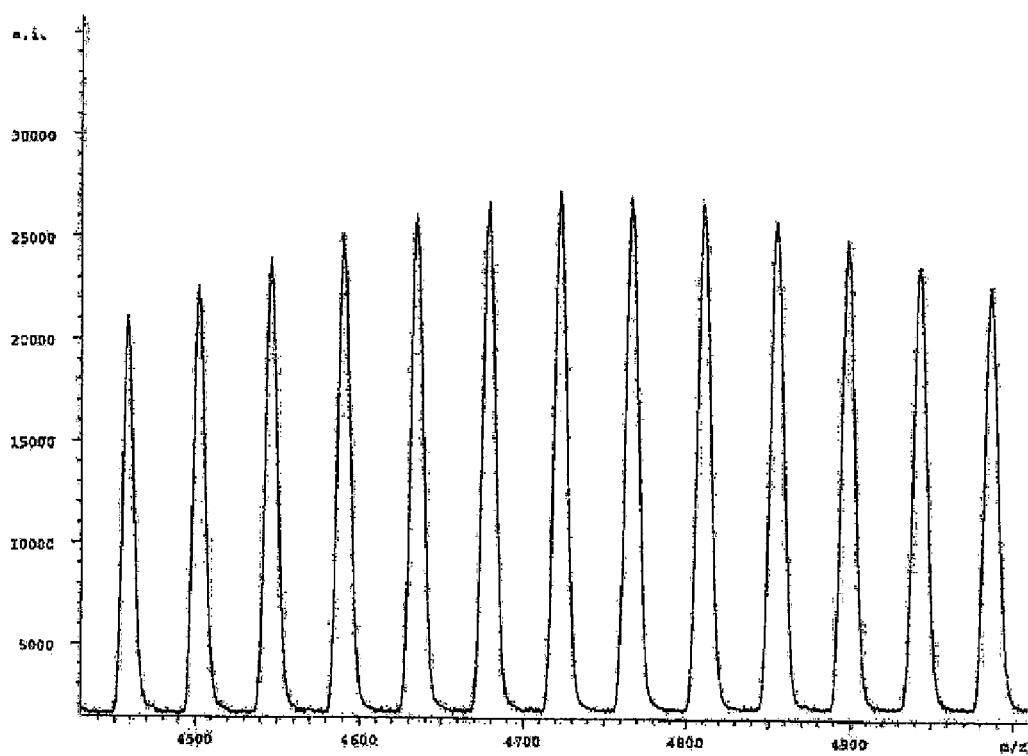
FIG. 3 is a MALDI-TOF spectrum of St-PEG-St.

FIG. 2 shows the NMR spectrum of St-PEG-St together with assignments. Integration of the protons associated with the $CH_2$=CH— end groups relative to those of the backbone $CH_2$'s of PEG indicates close to quantitative functionalization. MALDI-TOF analysis (see FIG. 3) shows an absence of OH— end groups (or other chain ends), corroborating the conclusions reached by $^1$H NMR spectroscopy. FIG. 3 shows the center slice of the MALDI-TOF spectrum of St-PEG-St and indicates only peaks associated with different degrees of polymerization PEG carrying vinylbenzyl termini.

Chain Extender/Crosslinker:

As is discussed above, the present invention utilizes a molecule Y that acts as a chain extender that enables/facilitates the bonding of one polymer chain to another polymer chain. In one embodiment, the chain extender Y of the present invention enables/facilitates the bonding of at least one hydrophilic polymer chain to at least one hydrophobic polymer chain thereby yielding functional multiblock copolymers according to the formula $(AY)_x(BY)_y$.

Molecule Y also mediates the condensation/crosslinking of the multiblocks thereby yielding the desired amphiphilic networks/co-networks. Specifically, in one embodiment, the crosslinking function served by molecule Y can be accomplished by crosslinking to any one or more of another Y molecule in another functional multiblock copolymer chain, or to any suitable portion of the polymer chains contained in another functional multiblock copolymer chain. In one embodiment, the crosslinking function accomplished by Y is the result of a crosslinking bond formed between two Y molecules, each Y molecule being located in a separate functional multiblock copolymer chains As is discussed above, in one embodiment molecule Y can be any molecule that is at least a tri-functional molecule. In another embodiment, Y is a tetra-functional molecule. In one embodiment, Y is a tri-functional silane. Although not limited thereto, Y can be a silane according to the Formula (I) shown below:

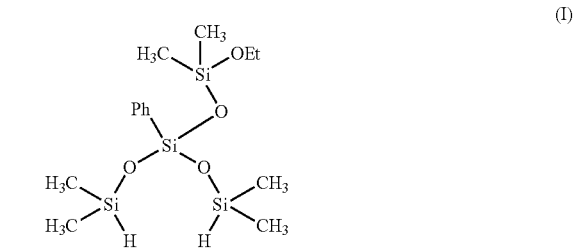

The compound according to Formula (I)—bis(dimethylsilyloxy) etoxydimethylsilyloxy phenylsilane—(Ph)Si(OSi$(CH_3)_2$H$)_2$(OSi$(CH_3)_2$OEt)—is effective for the synthesis of an target amphiphilic network because (Ph)Si(OSi$(CH_3)_2$H$)_2$ (OSi$(CH_3)_2$OEt) contains two Si—H groups to extend vinyl-telechelic polymers by cohydrosilation, and a Si—OEt group to condense two Y units to form a crosslink.

The central silicon Si atom in (Ph)Si(OSi$(CH_3)_2$H$)_2$(OSi $(CH_3)_2$OEt) is connected to three oxygens and can be more vulnerable to hydrolysis than the polymers used in the present invention. Accordingly, to increase the hydrolytic stability of this Si atom a phenyl substituted compound can be used.

The synthesis of (Ph)Si(OSi$(CH_3)_2$H$)_2$(OSi$(CH_3)_2$OEt) is carried out according to the reaction scheme shown below:

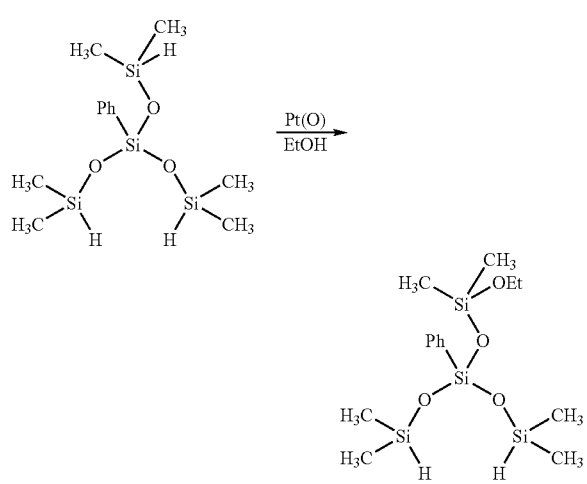

In a suitable flask 50 grams (0.152 moles) of tris(dimethylsiloxy)phenylsilane (available from Gelest, Tulleytown, Pa.) and 5 grams (0.111 moles) of anhydrous ethanol (Fisher) are mixed together. Fifty microliters (50 μL) increments of Karstedt's catalyst (a divinyldisiloxane complex—available from Gelest) are added to the solution after 10, 30 and 60 minutes of stirring. After two additional hours of stirring at room temperature, the mixture is vacuum distilled to remove the catalyst. Rectification on a spinning band column yields 19 grams of (Ph)Si(OSi(CH$_3$)$_2$H)$_2$(OSi(CH$_3$)$_2$OEt) (see Formula (I)), a colorless liquid having a purity greater than 98%, as confirmed by GC.

Generically, the compound according to Formula (I) can be synthesized by reacting tris(dimethylsilyloxy)phenylsilane with ethanol (EtOH) at a molar ratio of silane to alcohol of 1:0.333 in the presence of the Karstedt's catalyst. This reaction yields the target molecule (Formula (I)), plus di- and tri-OEt substituted by-products. The boiling points of these products are significantly different (approximately 10 to 15° C./OEt group), and the by-products can be easily separated by a spinning band column. Using the above techniques it is possible to consistently obtain high purity (greater than 97% as confirmed by GC) (Ph)Si(OSi(CH$_3$)$_2$H)$_2$(OSi(CH$_3$)$_2$OEt).

Figure 4:
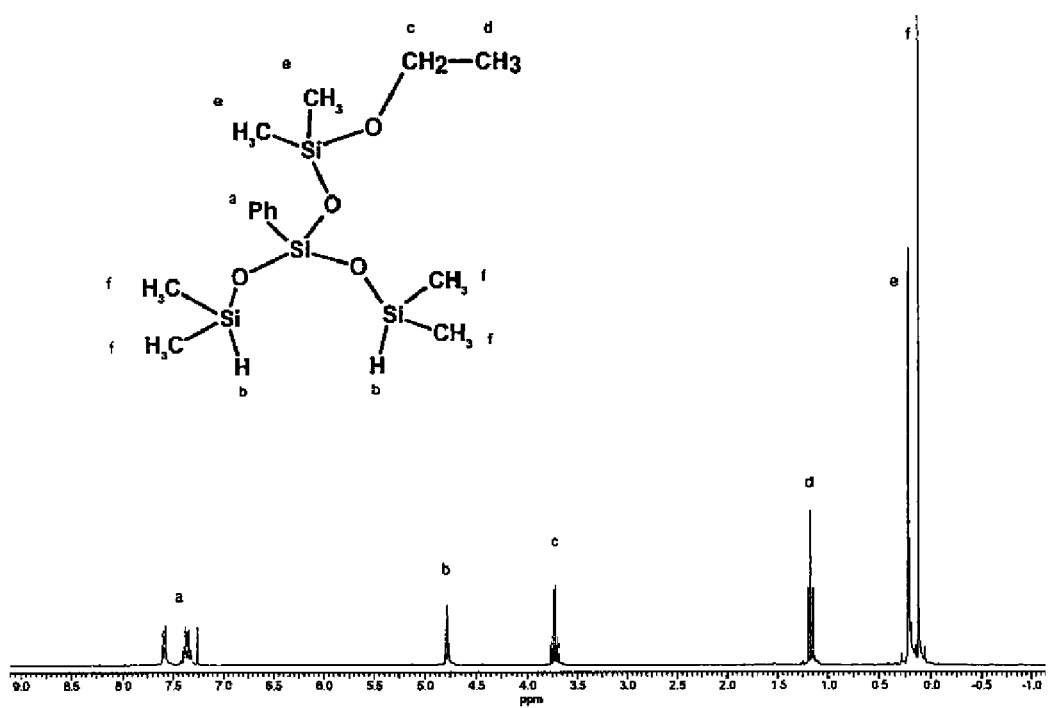
FIG. 4 is a $^1$H NMR spectrum of a chain extender/crosslinker according to one embodiment of the present invention.

FIG. 4 shows the $^1$H NMR spectrum of (Ph)Si(OSi(CH$_3$)$_2$H)$_2$(OSi(CH$_3$)$_2$OEt) and the key assignments. The spectrum confirms the expected structure. It should be noted that the use of the expensive spinning band column can be avoided by using acetic acid in place of ethanol in the above-mentioned reaction. The acetate substituent increases the boiling point differences between the mono-, di- and tri-substituted acetic acid reaction products to approximately 30 to 40° C./AcO group, and the target monoacetate can be obtained by simple vacuum distillation. The subsequent substitution of the AcO by EtO is a process known to those of ordinary skill in the art and a discussion herein is omitted for the sake of brevity. It should be noted however, that acetylation tends to yield small quantities of unidentified side products. Accordingly, in some circumstances it may be desirable to the EtOH synthesis route described above to yield the desired molecule Y for multiblock syntheses.

Functional Multiblock Copolymers:

As is discussed above, the amphiphilic networks or co-networks according to the present invention are synthesized using functional multiblock co-polymers according to the formula $(AY)_x(BY)_y$, where A represents an alkylene glycol polymer having n repeating alkylene glycol units, B represents a disubstituted siloxane polymer having m repeating siloxane units, and Y represents a molecule (e.g., a silane) that functions both as a chain extender and as a crosslinker.

As is noted above, one of the most important hurdles in the synthesis of amphiphilic co-networks is to overcome the massive macroscopic separation of the incompatible hydrophilic and hydrophobic polymer constituents. The present invention utilizes the dual purpose chain extender/crosslinker Y to accomplish this task. In preparing functional multiblock copolymers according to the formula $(AY)_x(BY)_y$ (which as discussed above can be random functional multiblock copolymers), the first step is the coupling of two incompatible telechelic pre-polymers and/or polymers to create a functional multiblock copolymer by the use of a dual-purpose chain extender/crosslinker Y in a solvent that adequately dissolves the hydrophilic and hydrophobic polymers that are to comprise the basis of the amphiphilic co-network.

The functional multiblock co-polymers of the present invention can be synthesized from any suitable combination of at least one hydrophilic polymer and at least one hydrophobic polymer. In addition to the combination of hydrophilic and hydrophobic polymers, the synthesis reaction that yields the desired functional multiblock co-polymers of the present invention also utilizes a suitable chain extending/crosslinking molecule Y, as is discussed above in detail.

Although the present invention is not limited thereto, one such suitable set of reactants is St-PEG-ST (see Formula (II)), V-PDMS-V (see Formula (III)), and (Ph)Si(OSi(CH$_3$)$_2$H)$_2$(OSi(CH$_3$)$_2$OEt) (see Formula (I)). In this case St-PEG-St is molecule A and V-PDMS-V is molecule B in the generic formula $(AY)_x(BY)_y$. Using the synthesis method described below these three reactants yield a functional multiblock copolymer having the following formula:

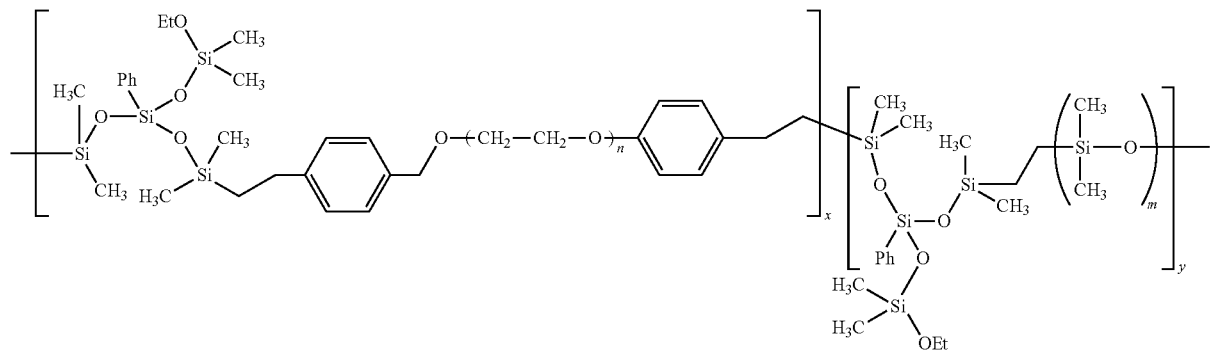

where n and m are independently equal to an integer in the range of about 5 to about 5,000, or from about 10 to about 2,500, or from about 25 to about 1,000, or even from about 40 to about 500, and x and y are independently equal to an integer in the 5 to about 50,000, or from about 50 to about 25,000, or from about 100 to about 10,000, or from about 250 to about 5,000, or even from about 500 to about 1,000.

Due to the strict control of the stoichiometry of the reactants (see the discussion below), a random multiblock with controlled molecular weights can be obtained as a result of the present invention. The molecular weight of the multiblock copolymer can be controlled by the relative concentrations of the reaction partners (i.e., the chain extender Y in relation to the amount of polymers A and B). As is discussed above, Y is a dual-purpose chain extender/crosslinker. In one embodiment, Y is tri-functional, two functions of which are designed to extend the telechelic pre-polymers and/or polymers to a random functional multiblock copolymer, while the third function (crosslinking) is inert during extension.

After chain extension is complete, the second step is to crosslink the functional multiblock copolymer via Y, thereby yielding an amphiphilic co-network.

The use of functional multiblock copolymers $(AY)_x(BY)_y$ for the synthesis of well-defined amphiphilic co-networks is fundamentally superior to syntheses of such co-networks by the use of end-functional di-blocks (e.g., Y-AB-Y) or tri-blocks (e.g., Y-ABA-Y). First of all, the removal of contaminating starting materials from the multiblocks copolymers of the present invention is far easier and more efficient than from di- or tri-blocks. Indeed, the separation of contaminating A or B blocks from AB di-blocks, or AB di-blocks from ABA tri-blocks is virtually impossible by conventional wet techniques because such blocks form stable micelles in solution. In contrast, the removal of starting A or B blocks from $(AY)_x(BY)_y$ multiblock copolymers of the present invention is easy by sequential extraction with differentiating solvents for the A and B blocks, respectively.

In the above example, the PEG and PDMS contaminants of $(PEG-Y)_x(PDMS-Y)_y$ can be easily removed by methanol and hexane extractions, respectively (i.e., by solvents in which the multiblock is insoluble).

Another significant advantage of the use of functional multiblock copolymers according to the generic formula $(AY)_x(BY)_y$ over end-functional di- or tri-blocks is in crosslinking. Crosslinking of $(AY)_x(BY)_y$ copolymers is efficient and rapid because it involves much less structural reorganization than end-linking of telechelic AB or ABA blocks. While multiblocks self-aggregate into co-continuous morphologies over a broad composition range, di- or tri-blocks produce mostly lamellar or cylindrical morphologies which may not give co-continuous architectures upon crosslinking. Lastly, multiblocks do not contain gel, and, unlike branched amphiphilic blocks, are easily processable.

Co-networks formed by the crosslinking of well-defined multiblocks are, in most cases, ideal (i.e., the lengths of each hydrophilic and hydrophobic chain elements, respectively, are identical). In addition, such co-networks contain tetra-functional crosslinkers as is shown in the generic formula below that represents a portion of a co-network and in FIG. 1.

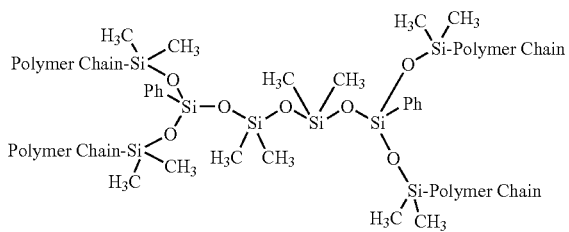

The words "Polymer Chain" denote bonds that are formed with a suitable hydrophilic polymer (denoted by A in the above-mentioned generic formula) or a suitable hydrophobic polymer (denoted by B in the above-mentioned generic formula). The chain extension bonds are formed via a one to one reaction between a terminal end of a polymer chain with each of the hydrogens in the silane according to Formula (I). The two chain extending Y molecules are then crosslinked via each Y molecule's ethoxy group to yield the above tetra-functional chain extender/crosslinker. The fact that exactly four chains emanate from each crosslink site is desirable for narrow hydrophilic pore size distribution.

After a suitable combination of hydrophilic and hydrophobic polymers (e.g., St-PEG-St and V-PDMS-V) are reacted with a suitable chain extender/crosslinker Y (e.g., (Ph)Si(OSi(CH$_3$)$_2$H)$_2$(OSi(CH$_3$)$_2$OEt)) via a co-hydrosilation reaction to yield a functional multiblock copolymer according to the generic formula $(AY)_x(BY)_y$, the functional multiblock copolymer is then crosslinked, as is discussed above, by molecule Y via an acid catalyzed condensation reaction detailed below:

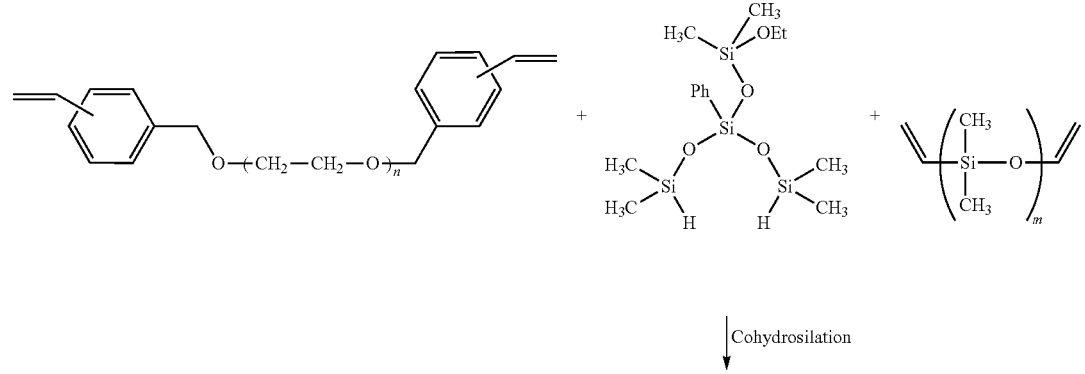

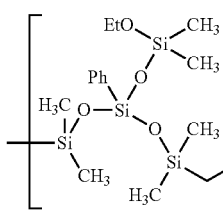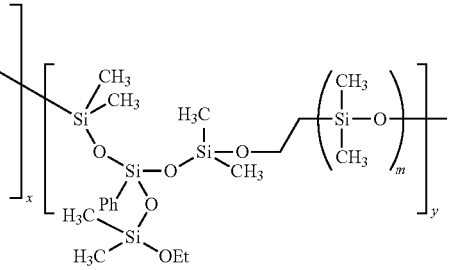

After extension, the above multiblock copolymer contains an ether linkage between the PEG and styryl moieties. This bond is inert during hydrosilation and subsequent crosslinking and it has the same or better overall chemical stability as PEG. Chain end modification did not affect the narrow molecular weight distribution of the starting HO-PEG-OH used to form the St-PEG-St. The molecular weight distribution of the PEG segment should be narrow to obtain membranes/co-networks with well-defined hydrophilic channel dimensions.

Exemplary Multiblock Copolymer Synthesis:

The multiblock copolymer, —(PEG-Y)$_x$—(PDMS-Y)$_y$—, shown in the above reaction immediately above is synthesized as follows, where Y is converted to structure (Ia) shown below in order to link the polymers and yield the desired multiblock copolymer:

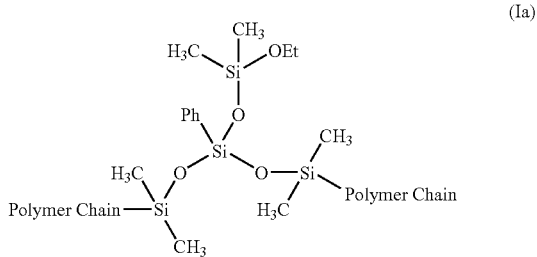
(Ia)

where the words "Polymer Chain" denote the fact that at least one hydrophilic polymer chain and/or at least one hydrophobic polymer chain are bonded to structure (Ia).

Eight grams (1.67 mmol) of St-PEG-St and 8.7 grams (1.45 mmol) of V-PDMS-V are dissolved in 160 grams of toluene. Next, 2 grams of powdered CaH$_2$ is added to the mixture. The solution is stirred for one hour, filtered under N$_2$ and 1.25 grams (3.81 mmol) of (Ph)Si(OSi(CH$_3$)$_2$H)$_2$(OSi(CH$_3$)$_2$OEt) is added. Hydrosilation is initiated by the addition of 290 ml of Karstedt's catalyst and allowed to proceed for three hours at 60° C. The reaction product is permitted to cool for an hour, and then the toluene solvent is evaporated and the product is dried under vacuum. The copolymer product is extracted by 2×500 mL hexane, dried in vacuum, extracted by 3×800 mL methanol, and dried in vacuum. The yield is 12.2 grams. The multiblock copolymer is a slightly yellow rubbery material.

Toluene is used as the solvent in which the reaction is carried out because it is inert with respect to the polymer charges used to produce the desired multiblock copolymer. The charges should be dry to prevent the oxidation of —SiH groups to —SiOH groups (i.e., premature crosslinking), and/or the formation of too low molecular weight (M$_W$) products, and their slow condensation. Thus, the polymer charges can be dried with CaH$_2$ to reduce/eliminate the chance that premature crosslinking occurs.

Statistics dictates that despite the unequal reactivities of the St and V end groups toward hydrosilation by (Ph)Si(OSi (CH$_3$)$_2$H)$_2$(OSi(CH$_3$)$_2$OEt) (the vinylsilyl group is much more reactive than the styryl group), random multiblock copolymers will arise because of the stoichiometry used:

St-PEG-St/(Ph)Si(OSi(CH$_3$)$_2$H)$_2$(OSi(CH$_3$)$_2$OEt)/V-PDMS-V=x/≈2(x+y)/y where x and y are the concentrations of the two polymers, respectively. Due to this stoichiometry, the first product that must arise is (Ph)Si(OSi(CH$_3$)$_2$H)(OSi(CH$_3$)$_2$OEt)-PDMS-(Ph)Si(OSi(CH$_3$)$_2$H)(OSi(CH$_3$)$_2$OEt)- because one of the SiH functions in (Ph)Si(OSi(CH$_3$)$_2$H)$_2$(OSi(CH$_3$)$_2$OEt) is preferentially consumed by the vinyl termini of V-PDMS-V; negligible amounts of (Ph)Si(OSi(CH$_3$)$_2$H)(OSi(CH$_3$)$_2$OEt)-PEG-St may also form.

During the first phase of the reaction, the concentrations of V-PDMS-V and (Ph)Si(OSi(CH$_3$)$_2$H)$_2$(OSi(CH$_3$)$_2$OEt) gradually diminish, while that of St-PEG-St remains essentially unchanged. During the second phase the hydrosilation of St-PEG-St starts, however, at this point essentially all V-PDMS-V is consumed. At this stage the —SiH groups that remain to react with St-PEG~ are mainly those attached to PDMS, i.e., —PDMS—Si(Ph)(OSi(CH$_3$)$_2$H)(OSi(CH$_3$)$_2$OEt). In this sense St-PEG-St is a chain extender of Si(Ph)(OSi(CH$_3$)$_2$H)(OSi(CH$_3$)$_2$OEt)-PDMS—Si(Ph)(OSi(CH$_3$)$_2$H)(OSi(CH$_3$)$_2$OEt) (or larger Si(Ph)(OSi(CH$_3$)$_2$H)(OSi(CH$_3$)$_2$OEt)-telechelic PDMS blocks). Due to this concentration drift, co-hydrosilation will be random and therefore random multiblock according to the formula (AY)$_x$ (BY)$_y$ will form.

Since chain extension is akin to polycondensation, the molecular weights are a function of the stoichiometry of the reactants (i.e., r=[Y]/[polymers]). Chain extension will be inefficient if the concentration of the vinyl groups or Y is in excess—that is if r is greater than 1.4 or less than 1.0. The molecular weight of the multiblock copolymers will be low and they will be contaminated by the polymers starting materials. In the r equal to 1.4 to 1.0 range, the M$_n$ of the multiblock copolymers is controlled by r. In one embodiment, the M$_n$ range is about 30 to about 100 kg/mol (the degree of polymerization—DP$_n$ is in the range of about 6 to about 20). If the M$_n$ is less than about 30 kg/mol, significant amounts of di- or tri-blocks will form and crosslinking will be inefficient because these low M$_w$ species contain 1 to 4 SiOEt groups (depending on the type of chain ends)—not all of which may form crosslinks. If the M$_n$ is greater than about 100 kg/mol, multiblock copolymer processing will be cumbersome (high viscosity solutions and melts, residual stresses, etc will occur).

The nature of the terminus (SiH, St, or V), can be controlled by the use of a slight excess of Y or the polymer charges. When a slight excess of Y is used, the excess Y yields SiH terminated multiblocks rather than vinyl termini. While vinyl groups do not react with the SiOEt group of Y, SiH (or SiOH) may do so, which results in more efficient crosslinking of low $M_w$ multiblocks ($DP_n$=2 to 3), which do not contain multiple SiOEt functionalities. The multiblocks with SiH termini should be stored under vacuum to avoid the oxidation of SiH to SiOH groups (i.e., premature crosslinking).

from homopolymers can be readily removed by precipitation or extraction. The V-PDMS-V can be removed by hexane extractions (see column 4, Table 1) and the St-PEG-St (and/or homo-PEG blocks) can be removed by repeated extractions with methanol (column 5, Table 1). Those of skill in the art will recognize that there are other suitable methods by which to remove contaminants from the multiblock copolymers of the present invention. Accordingly, the present invention is not limited to just the extraction methods discussed above.

TABLE 1

| Multiblock Copolymer | Charge Compositions | | Extractables | | Composition and Mn of Extracted Multiblocks | | |
|---|---|---|---|---|---|---|---|
| | $PEG_{4.6k}$/Y/$PDMS_{6k}$ g/g % | Y/Polymers (r) mol/mol | Hexane Soluble g/g % | Methanol Soluble g/g % | PEG Content$^a$ g/g % | $M_n^b$ kg/mol | $M_n/M_w$ |
| MBC-17 | 20/7/73 | 1.2 | 28 | 10 | 17 | 56 | 2.4 |
| MBC-42 | 45/7/48 | 1.15 | 8 | 22 | 42 | 72 | 2.9 |

$^a$by $^1$H NMR
$^b$by GPC

Table 1 summarizes multiblock copolymers made in accordance with the present invention and some of their characteristics. Column one gives abbreviations (MBC=multiblock copolymer) with the digits specifying the percent PEG in the purified MBC. Columns two and three show the relative amounts of polymers and Y in the charges used to form each multiblock copolymer, and r, respectively. Columns four and five give the results of multiblock copolymer extractions in terms of percent hexane and methanol soluble fractions. Column six shows the PEG content of the multiblock copolymers determined by $^1$H NMR spectroscopy. Finally, columns seven and eight give molecular weight data obtained by GPC (with polystyrene calibration).

It should be noted that here, as well as elsewhere in the specification, number-average molecular weights ($M_n$'s), weight-average molecular weights ($M_w$'s), and molecular weight distributions (MWD) ($M_w/M_n$) are obtained with a Waters GPC instrument equipped with a series of six Styragel columns (HR 0.5, HR 1, HR 3, HR 4, HR 5 and HR 6; Waters) calibrated with narrow-MWD polystyrene standards, a refractive-index (RI) detector (Optilab, Wyatt Technology), a dual-ultraviolet absorbance detector (Waters 2487), and a laser light scattering detector (Minidawn, Wyatt Technology). The flow rate was 1 mL of THF/min.

Figure 5A:
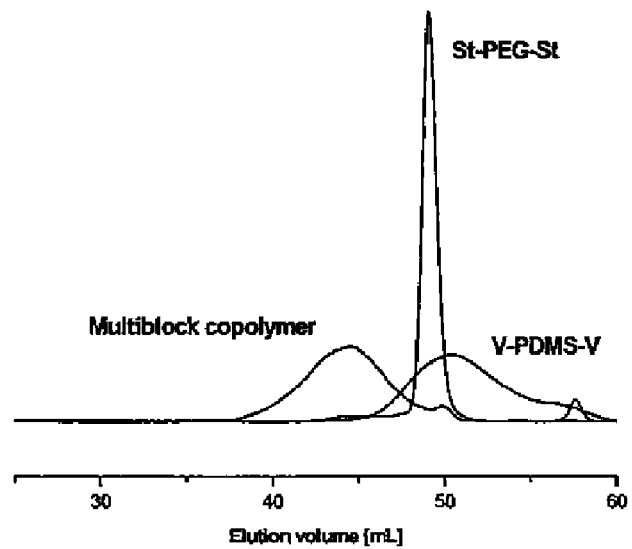
FIG. 5a is a GPC-RI trace of the polymer charge materials and the MBC-42 (see Table 1 below)

FIG. 5a shows the GPC-RI traces of the starting materials and the multiblock copolymer product MBC-42. The refractive index increments (dn/dc) in THF of both polymer charges are low, however, the value for PDMS is much smaller than that of PEG (dn/dc$_{PEG}$=0.46, dn/dc$_{PDMS}$<0.1). Thus the refractive index (RI) trace of the multiblock shows mainly the PEG constituent, while the PDMS segments are almost invisible. The product exhibits a relatively broad molecular weight distribution, typical of polymers made by polycondensation. High molecular weight contaminants are absent (no peaks or tails at low elution volumes) indicating that the —SiOEt groups were stable during synthesis and premature crosslinking did not occur. The small hump at 51 mL is due to unreacted PEG; a small amount of PDMS must also be present; however, it is invisible because of its very low dn/dc value.

Since the multiblock copolymers of the Table 1 are insoluble and do not form micelles in hydrophilic or hydrophobic solvents, contamination from the polymer charges or Extraction with methanol removes PEG quantitatively together with some low $M_w$ multiblocks. The relatively high methanol and hexane soluble fractions of MBC-42 and MBC-17 may be due to the broad molecular weight distribution of V-PDMS-V. Low $M_w$ multiblock copolymers ($DP_n$=2 to 5) and multiblock copolymers with higher than average PEG contents may be soluble in methanol, and, similarly, higher than average PDMS content multiblock copolymers may be soluble in hexane.

Figure 5B:
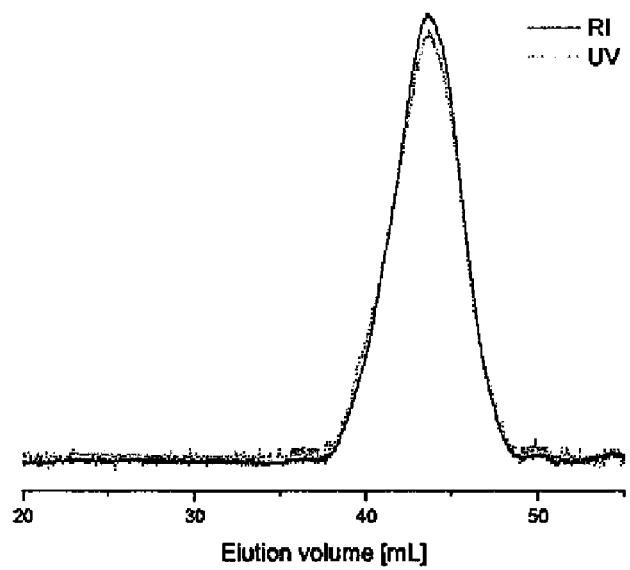
FIG. 5b is a GPC-UV and RI signal trace of MBC-42.

FIG. 5b shows the GPC-RI and -UV signals of MBC-42 after sequential extraction with hexane and methanol. Both polymers charges and low $M_w$ multiblock copolymers are absent. The UV adsorption is due to the terminal phenyl groups in St-PEG-St and to the phenyl substituent in the chain extender/crosslinker Y. The RI signal shows only the PEG component (dn/dc$_{PDMS}$ is less than 10% of dn/dc$_{PEG}$), whereas the UV signal is proportional to the PEG plus the chain extender/crosslinker Y. Thus a comparison of these signals gives the ratio of these moieties as a function of molecular weight ($M_w$). Since the UV and RI traces are essentially identical, the composition of the multiblock copolymers is independent of molecular weight (i.e., extension to multiblock copolymers is random).

The $M_n$'s of MBC-17 and MBC-42 were 56 and 72 kg/mol, respectively (La, $DP_n$=10 to 15). The multiple extractions slightly decrease the PEG content of the multiblock copolymers (see the charge and product compositions in Table 1). The PEG content decreases because hydrosilation of the styryl end groups is less efficient than that of the vinylsilyl groups, and because the PEG contents were calculated from $^1$H NMR spectra and the styryl end groups do not contribute to the PEG content of the multiblock copolymers.

Figure 6:
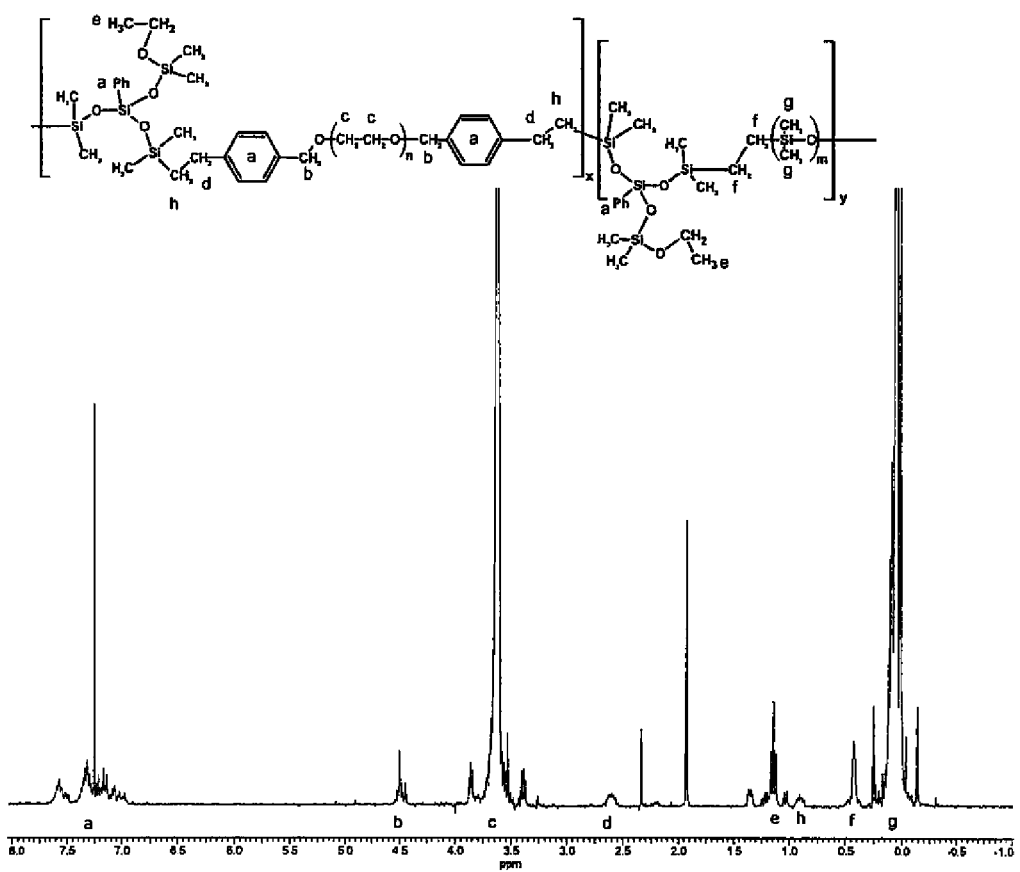
FIG. 6 is a $^1$H NMR spectrum of a multiblock copolymer according to one embodiment of the present invention (MBC-42 from Table 1 below)

FIG. 6 shows the $^1$H NMR spectrum of a representative multiblock copolymer together with assignments. As can be seen from the spectra of FIG. 6, the spectra illustrate the absence of vinylsilyl and styryl end groups, which in turn indicates essentially quantitative extension. Although a slight excess of $(Ph)Si(OSi(CH_3)_2H)_2(OSi(CH_3)_2OEt)$ is used in the examples of Table 1 (see Column 3), the SiH groups are invisible due to their very low concentration. The spectrum shows the expected resonances of the hydrosilated segments.

The multiblock copolymers form optically transparent membranes. Optical clarity is evidence for the absence of macroscopic phase separation, and suggests that the dimensions of the incompatible PEG and PDMS domains are well below the wavelength of visible light.

Figure 7:
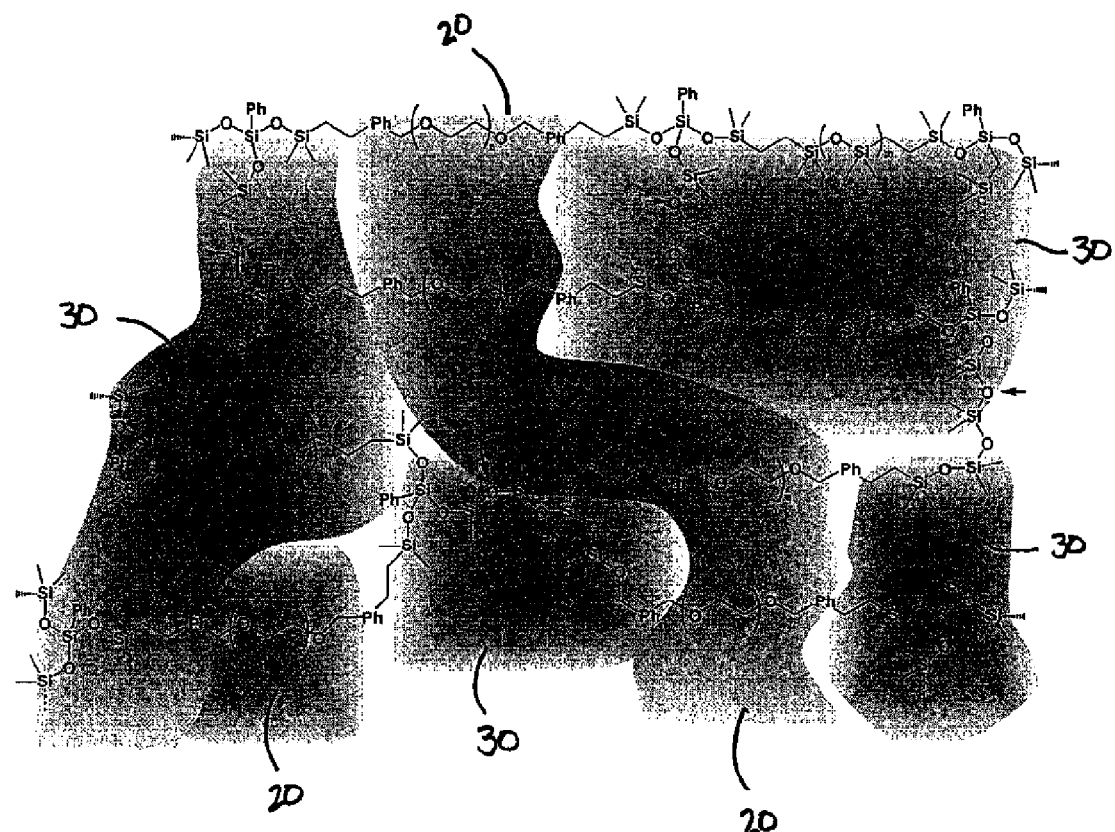
FIG. 7 is an illustration of an idealized structure of an amphiphilic co-network formed in accordance with one embodiment of the present invention in which the tetra-functional crosslinks are emphasized, the arrows indicate the newly formed oxygen bridges; the ∼ indicate continuing polymer segments; and the dashed lines indicate continuing crosslinks.

Amphiphilic Co-Networks:

The final step to obtain the co-networks of the present invention is subject a suitable multiblock copolymer to crosslinking. In the present invention, crosslinking is accomplished via condensation of the pendant SiOEt groups and the formation of intermolecular —SiOSi— bridges. FIG. 7 illustrates an idealized structure of an amphiphilic co-network formed in accordance with one embodiment of the present invention. In FIG. 7, the domains labeled with reference numeral 20 are co-continuous hydrophilic domains, and the domains labeled with reference numeral 30 are co-continuous hydrophobic domains.

Crosslinking of the multiblock copolymers of the present invention are effected by condensation via the addition an acid miscible with the multiblock copolymer in a toluene solution. In one embodiment, the present invention utilizes an alkylbenzene sulfonic acid. It should be noted that the present invention is not limited to solely the acid listed above. Those of ordinary skill in the art will recognize that other acids can be used to effect crosslinking of the multiblock copolymers formed in accordance with the present invention.

Alkylbenzene sulfonic acid performs satisfactorily at room temperature or, can be made to perform better at 60° C. in the presence of moisture to enhance the rate of crosslinking. Since the solubility of sulfonic acids and their salts in the siloxane phase is low, a benzene sulfonic acid with a long ($C_{11-13}$) alkyl substituent is utilized. This ensures good solubility in the PDMS phase. Crosslinking can be more efficient by the use of an acid partially neutralized with an amine. Accordingly, in one embodiment, a mixture of sulfonic acid/pyridinium sulfonate (50/50 mol/mol %) is used as a catalyst. The multiblock copolymers of the present invention are highly viscous liquids even above the melting point of PEG segments (approximately 50° C.). Therefore, polymer membranes are prepared, as detailed below, by casting multiblock copolymers dissolved in toluene via the use of glass molds at 60° C. The solvent rapidly evaporates and crosslinking is complete within approximately 3 hours.

Amphiphilic co-networks in accordance with the present invention are prepared by: (1) crosslinking well-defined $(AY)_x$ $(BY)_y$ multiblock copolymers (see APCN-16 and APCN-40 in Table 2 below), and (2) by crosslinking mixtures of different compositions of multiblock copolymers (see APCN-24 and APCN-32 in Table 2 below).

TABLE 2

| Amphiphilic Co-Network | Multiblock Copolymer Charges | | THF Extractable g/g % | PEG Content of Extracted Networks[a] g/g % |
|---|---|---|---|---|
| | MBC-17 % | MBC-42 % | | |
| APCN-16 | 100 | — | 2.6 | 16 |
| APCN-24 | 66 | 33 | 2.3 | 24 |
| APCN-32 | 33 | 66 | 3.8 | 32 |
| APCN-40 | — | 100 | 4.2 | 40 |

[a]calculated from the PEG content of polymers charged and taking in consideration the PEG content of the extract (determined by $^1$H NMR)

Column 1 gives co-network abbreviations (APCN=amphiphilic co-network) with the digits indicating the percent PEG in the APCNs. Columns 2 and 3 give the compositions of the charges prepared with the two MBCs specified in Table 1. The membranes are exhaustively extracted with THF and Column 4 shows the THF soluble fractions. The low amounts of THF solubles (less than 4.2%) indicate efficient crosslinking. The last column in Table 2 gives the PEG content of the membranes, calculated from the PEG contents on the charge, taking in consideration the PEG content of the THF soluble fraction (the latter determined by $^1$H NMR spectroscopy). The PEG content in the THF extract is generally a little higher than that of the charge. This results in a small decrease in the PEG content of the membrane. Alkyl sulfonate catalyst residues are also removed by extraction with THF. The final membranes are smooth and optically clear; optical clarity is construed as evidence for the absence of macroscopic phase separation of the PEG and PDMS segments.

Specifically, the synthesis of the amphiphilic co-networks detailed in Table 2 are accomplished as follows. Five one gram increments of each multiblock copolymer charge detailed in Table 2 are each dissolved in 10 mL of toluene. Given that there are four different multiblock copolymer combinations this yields a total of 20 samples. Each multiblock copolymer solution contains 0.0002 moles of SiOEt groups. Next, 3.2 mg of alkylbenzene sulfonic acid (available from Alfa Aesar) and 0.3 mg pyridine are added to each of the 20 solutions. The solutions are then poured into individual glass molds. The molds each have a diameter of 6 cm. All of the molds are then heated in an oven at 60° C. until the toluene evaporates (approximately 30 minutes). The remaining samples in each mold are then heated for 3 more hours at 60° C., removed from their respective molds, dried in vacuum and extracted with tetrahydrofuran until weight constancy. The co-networks produced by the above process are transparent rubbery sheets.

In light of the above, the present invention permits, among other things, the synthesis of nearly ideal tetra-functional amphiphilic co-networks consisting of PEG and PDMS segments. The synthesis can be achieved by using a dual-purpose chain extender/crosslinker $(Ph)Si(OSi(CH_3)_2H)_2(OSi(CH_3)_2OEt)$ (see Formula (I))—whose first function is to extend the incompatible PEG and PDMS polymers into functional multiblock copolymers according to the formula $(AY)_x$ $(BY)_y$, and subsequently crosslink the multiblock copolymers by condensing the SiOEt functions into —Si—O—Si— bridges. As detailed above, in one embodiment, the present invention relates to amphiphilic co-networks formed from multiblock copolymers of with the following structure —(PEG-$(Ph)Si(OSi(CH_3)_2H)_2(OSi(CH_3)_2OEt)$-PDMS-$(Ph)Si(OSi(CH_3)_2 H)_2(OSi(CH_3)_2OEt))_n$.

Swelling Characteristics of the Amphiphilic Co-Networks:

The equilibrium swelling characteristics of various amphiphilic co-networks made in accordance with the present invention are determined at room temperature. Suitable pre-weighed co-network samples (approximately 20×20×0.4 mm) are placed in distilled water, and periodically gently shaken. The extent of swelling is determined periodically by removing the membranes from the solvent, removing the water adsorbed to the surfaces by blotting with tissue paper, and weighing the membranes. Equilibrium swelling is recorded when the weight of the water-swollen membranes do not change for 24 hours in the solvent (water). The swelling of co-networks in water is obtained by the following formula:

$$S_{H_2O} = 100(m_{sw,H_2O} - m_d)/m_d.$$

where $m_{sw,H_2O}$ and $m_d$ are the masses of water-swollen and dry co-networks, respectively.

The above procedure is used to determine the swelling of the same co-networks in n-heptane. The swelling of co-networks in n-heptane is obtained by the following formula:

$$S_{C_7}=100(m_{sw,C_7}-m_d)/m_d$$

where $m_{sw,C_7}$ is the mass of n-heptane-swollen membrane.

The swelling of PEG domains in water, and that of PDMS domains in n-heptane is expressed by the following formulas:

$$S_{H_2O,PEG}=100(m_{sw,H_2O}-m_d)/m_{PEG}$$

and $$S_{C_7,PDMS}=100(m_{sw,C_7}-m_d)/m_{PDMS}$$

where $m_{PEG}$ and $m_{PDMS}$ are the masses of the PEG and PDMS domains in the co-networks, respectively.

Figure 8:
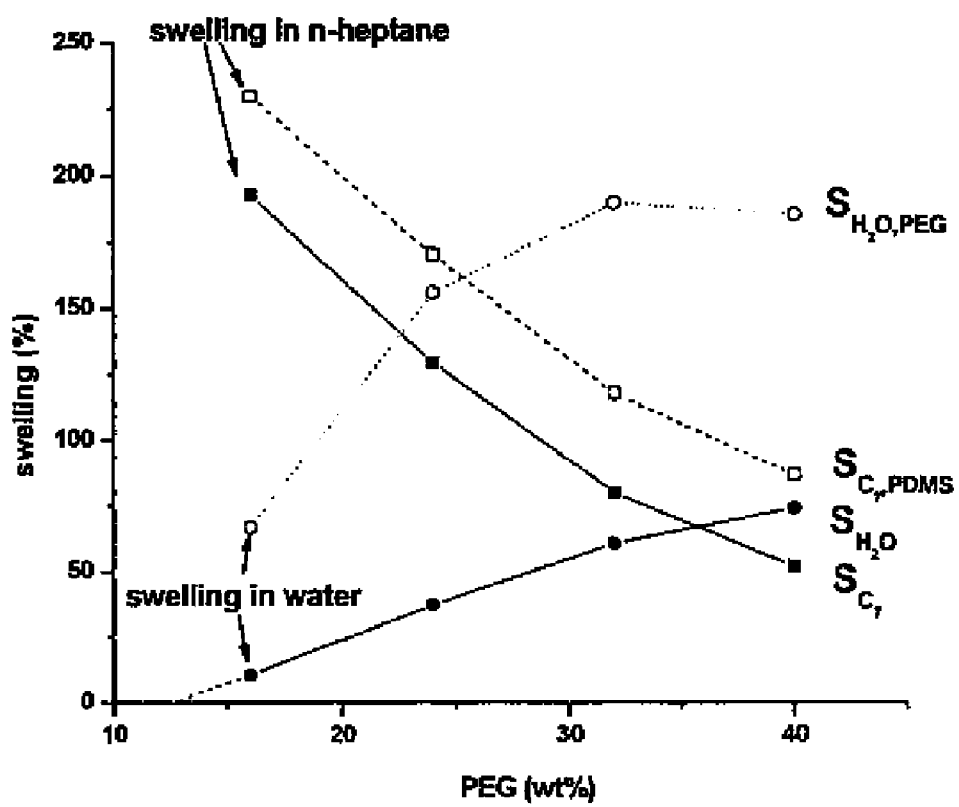
FIG. 8 is an illustration of the swelling behavior of PEG/PDMS amphiphilic co-networks in water and n-heptane. $S_{H_2O}$ and $S_{C_7}$ are swelling ratios relative to the dry mass of the co-networks, $S_{H_2O,PEG}$ and $S_{C_7,PDMS}$ are swelling ratios of the swollen PEG and PDMS phases relative to the dry masses of PEG and PDMS.

FIG. 8 shows the swelling behavior of various composition co-networks in water and n-heptane, $S_{H_2O}$ and $S_{C_7}$, and the swelling of PEG domains in water and PDMS domains in n-heptane, $S_{H_2O,PEG}$ and $S_{C_7,PDMS}$, as a function of PEG content (the PEG content corresponds to the number given in column 1 of Table 2). The swelling in water increases with increasing PEG content. Conversely, the swelling decreases in n-heptane with increasing PEG content. The swelling in water can be smoothly back-extrapolated to approximately 13% PEG, suggesting that water starts to percolate at this PEG content. The fact that both water and n-heptane swell these co-networks indicates bi-continuous/bipercolating architecture of incompatible PEG and PDMS phases.

Inspection of the swelling behavior of the individual domains, specifically PEG in water and PDMS in n-heptane as the function of PEG content, provides important information regarding co-network morphology. According to the data shown in FIG. 8, the swelling of the PEG domain, $S_{H_2O,PEG}$ increases with PEG content and reaches saturation in the 24 to 32% PEG range. In this range the connectivity of the PEG phase reaches a limit and the co-network is unable to imbibe more water even with increasing PEG in the system. In contrast, $S_{C_7,PDMS}$ increases monotonically with decreasing PEG (increasing PDMS) content, and keeps increasing even beyond 240% measured at 16% PEG. These observations reflect the fact that the interaction parameter for PDMS/n-heptane is higher than that of PEG/water (i.e., the affinity of PDMS to n-heptane is higher than that of PEG to water).

As depicted in FIG. 8, the water and n-heptane swelling curves cross at approximately 36% PEG. This crossover occurs at much less than 50% PEG because of the detailed morphology of the co-networks investigated in FIG. 8. While not wishing to be bound to any one theory, it is probable that the crystalline PEG domains prevent the n-heptane-swollen rubbery PDMS domains from reaching the degree of swelling of a homo-PDMS network. Evidently, the amphiphilic co-networks investigated in FIG. 8 are crosslinked not only by covalently bonded domains but also by physical van der Waals forces, akin to thermoplastic elastomer networks. In the amphiphilic co-networks of the present invention the crystalline PEG is the hard domain and the n-heptane-swollen rubbery PDMS is the soft domain. By increasing the PEG content, the sizes/volumes of the hard PEG domains increase, and their contribution to the overall crosslink density of the network increases.

The membranes are optically clear when placed in both water and n-heptane, and remain clear during swelling indicating a nano-structured morphology in which the dimensions of the incompatible PEG and PDMS domains is less than about 400 nm (i.e., much less than the wave length of visible light).

Oxygen Permeability of Amphiphilic Co-Networks:

The oxygen permeability of the following co-networks from Table 2—APCN-24, APCN-32, and APCN-40—are determined by using the equipment and a methodology described below to measure the oxygen permeability of highly oxygen permeable membranes for soft contact lens application.

The oxygen permeability of water-swollen membranes (usually expressed by Dk in barrer units) is a critical parameter of many materials, particularly of contact lenses. According to various analyses, the internationally accepted Fatt method for the determination of oxygen permeabilities of hydrogels, is, however, unsuitable to determine Dk's above 100 barrers (see International Standard ISO 9913-1: 1996 (E)). Accordingly, in order to determine precise Dk's values in the 100 to 800 barrer range the following method is utilized.

Figure 9:
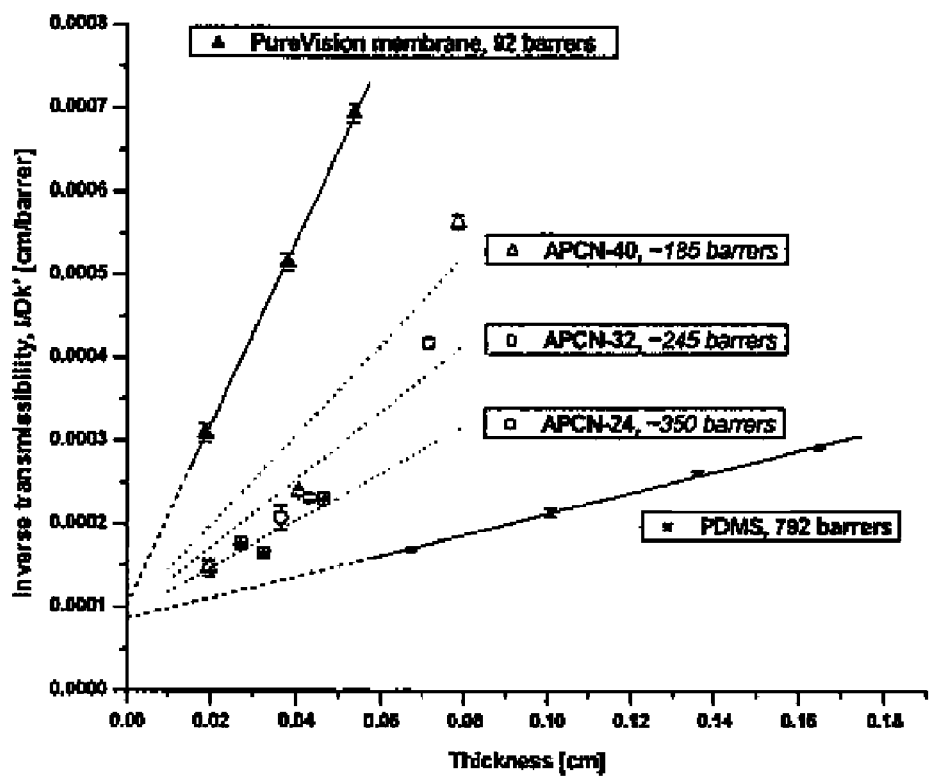
FIG. 9 is a series of plots that permit the calculation of the oxygen permeability of various amphiphilic co-networks made in accordance with one embodiment of the present invention.

The oxygen permeability of water-swollen membranes is obtained from the slopes of linear I/Dk' versus I plots (where Dk' is the apparent permeability and I membrane thickness). Table 3 shows experimental data, and FIG. 9 shows 1/Dk' vs. I plots for a series of membranes; for comparison, FIG. 9 also shows a plot obtained with a PDMS membrane, whose permeability is determined to be 792 barrers, and a plot for a set of membranes used in extended-wear soft contact lenses (92 barrers, PureVision, Bausch & Lomb Co.).

TABLE 3

| | Apparent permeability, Dk', in barrer (thickness, in μm) | | |
|---|---|---|---|
| Co-Network[a] | Sample 1 | Sample 2 | Sample 3 |
| APCN-24 | 155 (272) | 197 (325) | 202 (465) |
| APCN-32 | 176 (375) | 186 (432) | 171 (714) |
| APCN-40 | 133 (196) | 170 (406) | 140 (785) |
| PureVision | 60.8 (188) | 73.9 (381) | 77.3 (536) |

[a]The digits indicate the % PEG content in the amphiphilic co-networks.

The procedure of casting membranes of various thicknesses is described above.

To obtain an estimate of oxygen permeabilities of the co-networks listed in Table 3, the apparent oxygen permeabilities (Dk's) are determined for membranes prepared in the 0.02 to 0.08 cm thickness range. The diffusional resistance of the boundary layer is set at 0.00009 cm/barrer (see the intercept on the y axis in FIG. 9), a value characteristic of for the instrument used. This value does not vary much in the 100 to 800 barrer range, and therefore obtaining it by the indicated linear regression is acceptable. The slopes of the dotted lines yield Dk=approximately 350, Dk=approximately 245, and Dk=approximately 185 barrers for APCN-24, APCN-32, and APCN-40, respectively. As shown by the Dk' values in Table 1, the apparent oxygen permeabilities of these co-networks are 2 to 3 times higher than those of contemporary extended wear soft contact lens hydrogels. These values indicate that the oxygen permeabilities of co-networks form in accordance with the present invention are far above those ever reported for hydrogels.

Figure 10:
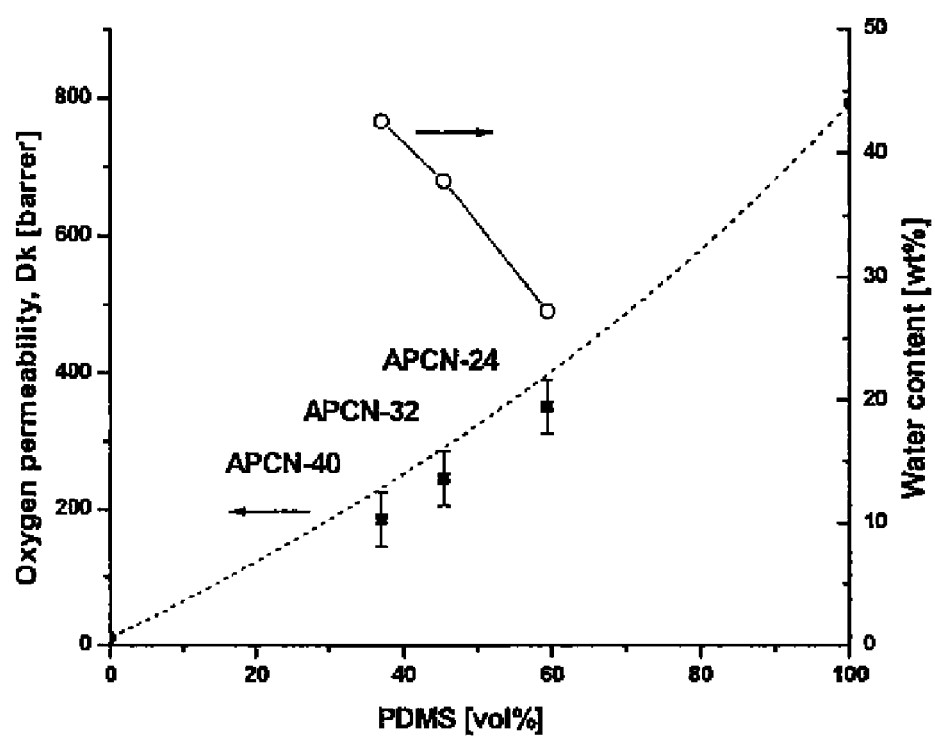
FIG. 10 is a graph of the oxygen permeabilities and water contents as a function of the PDMS volume fraction in water-swollen amphiphilic co-networks made in accordance with one embodiment of the present invention.

FIG. 10 shows the effect of PDMS content on the oxygen permeability of the three co-networks listed in Table 3. The solid line indicates the water content of the present invention's co-networks. The dashed line indicates the maximum permeability of an "ideal" PDMS/hydrogel co-network in which the PDMS phase is continuous over the entire composition range, is calculated by the following formulas:

$$P = P_1 \frac{(P_2 + 2P_1 - 2V_2(P_1 - P_2))}{(P_2 + 2P_1 + V_2(P_1 - P_2))}$$

where $P_1$ is the permeability of PDMS, $P_2$ is the permeability of the hydrogel (water-swollen PEG), and $V_2$ is the volume fraction of the PDMS. The apparent oxygen permeabilities of the membranes formed from the co-networks listed in Table 3 are not much below the theoretical maximum permeabilities. According to the data, the co-networks of the present invention are essentially bi-continuous even at relatively low PDMS contents.

Mechanical Properties of the Amphiphilic Co-Networks:

The tensile strength properties of water-swollen membranes are determined by using an Instron 5567 (20 N load cell) equipped with a mechanical extensometer at a crosshead speed of 5 mm/min. Microdumbells were die-cut according to ASTM 638-V (i.e., gauge length 7.62 mm, width 3.18 mm). Sample thickness is measured by a micrometer. Tensile strength properties of two or three specimens of each of the co-networks (co-networks APCN-16, APCN-24, APCN-32, and APCN-40) are determined and averaged.

Figure 11:
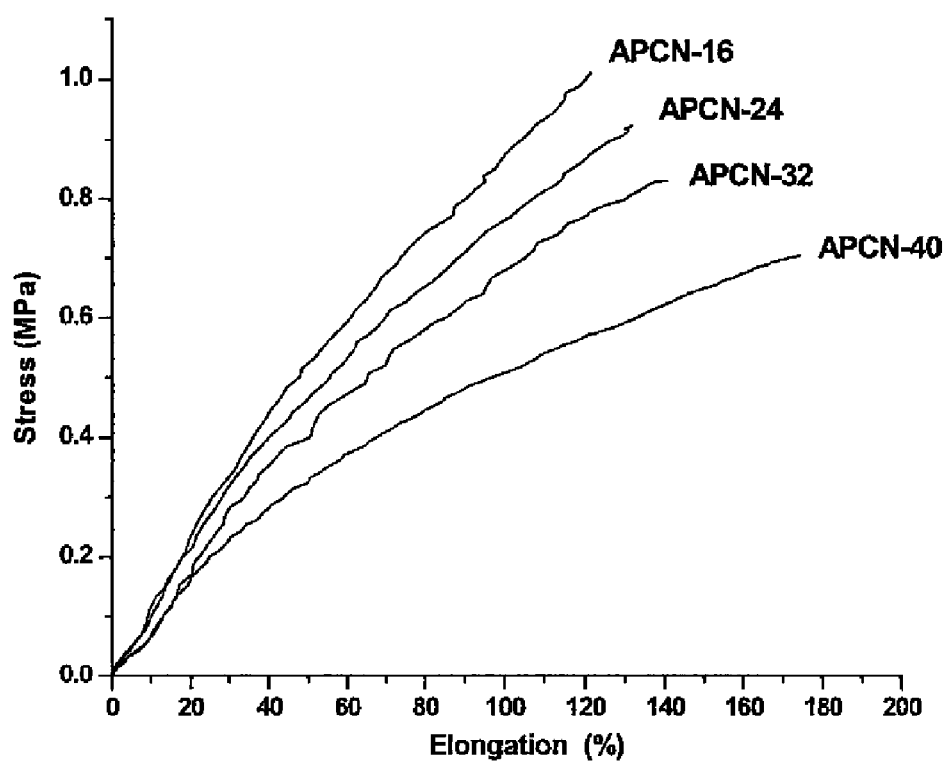
FIG. 11 is a graph of the stress-strain curves of various water-swollen amphiphilic co-networks made in accordance with one embodiment of the present invention.

FIG. 11 shows the stress/strain profiles of a series of water-swollen amphiphilic co-networks (co-networks APCN-16, APCN-24, APCN-32, and APCN-40). Table 4 summarizes the mechanical properties of these water swollen co-networks.

TABLE 4

| Co-Network | Tensile Strength [MPa] | Elongation [%] | Modulus [MPa] |
|---|---|---|---|
| APCN-16 | 1.00 | 118 | 1.10 |
| APCN-24 | 0.91 | 132 | 0.98 |
| APCN-32 | 0.84 | 140 | 0.90 |
| APCN-40 | 0.71 | 175 | 0.67 |

As can be seen from the data above, the tensile strengths and elongation percentage decrease with increasing PEG content, whereas the moduli show an increase with increasing PEG content. These trends are in line with overall co-network compositions, and reflect the effect of the swelling of the PEG phase on the mechanical properties. Remarkably, the tensile strength of even the APCN-40 (i.e., the co-network with 40% PEG) is superior to an unfilled PDMS network of the same molecular weight between crosslink points ($M_c$) and crosslink density (0.6 MPa). Overall, these properties are sufficient or even surpass the requirements for biological, including ophthalmic, applications.

Thermal Behavior Properties of the Amphiphilic Co-Networks:

DSC scans are performed by a DuPont 2100 thermal analyzer under a nitrogen atmosphere with a heating rate of 10° C./min. The first order (melting) transition is the minimum of the DSC endotherm. Glass-transition temperatures ($T_g$'s) are obtained after two heating/cooling cycles by the use of the midpoint method.

Figure 12:
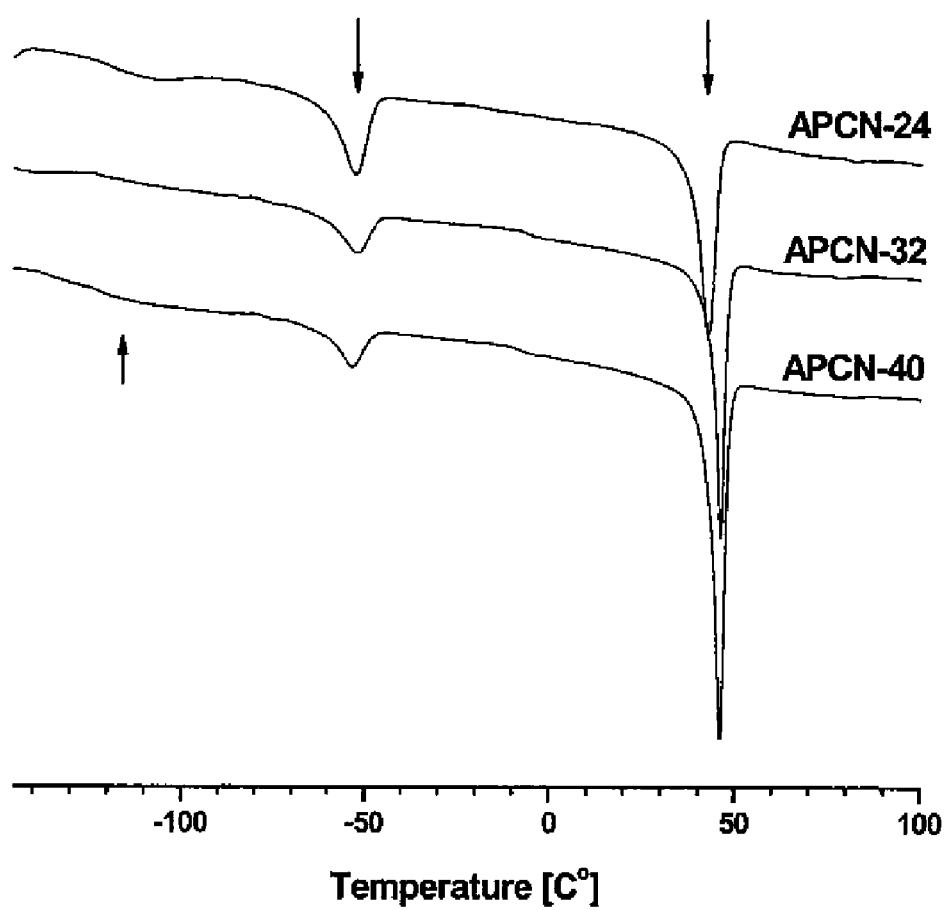
FIG. 12 is a plot of the DSC traces of PEG/PDMS amphiphilic co-networks, where the up arrow indicates the glass transition temperature of PDMS and the down arrows indicate melting peaks of the PDMS and PEG phases.

FIG. 12 shows the DSC scans of three amphiphilic co-networks of different PEG contents as listed therein. The traces indicate two first order (melting) transitions: one at −52° C. associated with the crystalline PDMS phase and another at approximately 46° C. due to the crystalline PEG phase. The latter transition reflects the melting of PEG segments of $M_n$=4.6 kg/mol, and is significantly lower than 62° C., the melting point of PEG of the same $M_n$. While not wishing to be bound to any one theory, this shift to lower temperatures occurs because the PEG segments are covalently linked to the soft PDMS phases. Although the molecular weights between crosslink points ($M_c$'s) of the PEG segments are the same in all three co-networks, the softening effect appears to be stronger with the co-network containing the least amount of PEG (APCN-24). The degree of crystallinity of the PEG domains in the co-networks is approximately 30% (La, much less than of pure PEG (70%)). While not wishing to be bound to any one theory, this is also due to the covalently bonded PDMS segments.

The second order transition ($T_g$'s) of the PDMS phase is discernible in the range of −125° C. to −100° C., however, the glass transition of the non-crystalline PEG could not be identified.

In light of the above results, in amphiphilic co-networks according to the present invention swelling in water increases with the PEG content, whereas in n-heptane the trend is reversed. The PEG domains become continuous with approximately 13% PEG, and co-continuity/bipercolation is evident over a wide composition range. Membranes made from amphiphilic co-networks according to the present invention are optically clear and remain clear after swelling in water and n-heptane. Co-networks swollen with n-heptane are combinations of two networks: one held together by covalent linkages between different domains, and the other by physical forces akin to thermoplastic elastomers. Optical clarity is evidence for the presence of domains whose dimensions are below the wave length of visible light. The oxygen permeabilities of the co-networks of the present invention are far superior to those of commercial extended-wear soft contact lens membranes. The mechanical properties of water-swollen co-networks reflect their overall compositions and are deemed appropriate for biological application.

Although the invention has been described in detail with particular reference to certain embodiments detailed herein, other embodiments can achieve the same results. Variations and modifications of the present invention will be obvious to those skilled in the art and the present invention is intended to cover in the appended claims all such modifications and equivalents.

What is claimed is:

1. A multicomponent network comprising the reaction product of at least one hydrophilic polymer, at least one hydrophobic polymer and at least one silane compound, wherein the silane compound can act as both: (1) a chain extender and coupler for the combination of the at least one hydrophilic polymer and the at least one hydrophobic polymer, and (2) as a crosslinking agent compound;

wherein the at least one silane compound is at least one tri-functional silane compound; and wherein the at least one at least one tri-functional silane compound is a compound according to Formula (I):

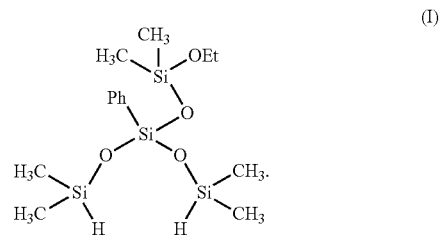

2. The multicomponent network of claim 1, wherein the at least one hydrophilic polymer is selected from at least one polyalkylene glycol polymer.

3. The multicomponent network of claim 2, wherein the number of repeating alkylene glycol repeating units in the at least one polyalkylene glycol polymer is in the range of about 5 to about 5,000.

4. The multicomponent network of claim 2, wherein the number of repeating alkylene glycol repeating units in the at least one polyalkylene glycol polymer is in the range of about 40 to about 500.

5. The multicomponent network of claim 1, wherein the at least one hydrophobic polymer is selected from at least one disubstituted siloxane polymer.

6. The multicomponent network of claim 5, wherein the number of repeating siloxane repeating units in the at least one disubstituted siloxane polymer is in the range of about 5 to about 5,000.

7. The multicomponent network of claim 5, wherein the number of repeating siloxane repeating units in the at least one disubstituted siloxane polymer is in the range of about 40 to about 500.

8. The multicomponent network of claim 1, wherein the multicomponent network is an amphiphilic co-network.

9. The multicomponent network of claim 1, wherein the multicomponent network is used to produce a film.

10. A multicomponent network comprising the reaction product of at least one polyethylene glycol polymer, at least one polydimethylsiloxane polymer and at least one silane compound, wherein the silane compound can act as both: (1) a chain extender and coupler for the combination of the at least one polyethylene glycol polymer and the at least one polydimethylsiloxane polymer, and (2) as a crosslinking agent compound;
wherein the at least one silane compound is at least one tri-functional silane compound, and
wherein the at least one at least one tri-functional silane compound is a compound according to Formula (I):

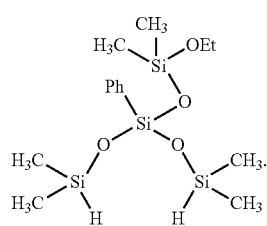
(I)

11. The multicomponent network of claim 10, wherein the number of repeating ethylene glycol repeating units in the at least one polyethylene glycol polymer is in the range of about 40 to about 500.

12. The multicomponent network of claim 10, wherein the number of repeating siloxane repeating units in the at least one polydimethylsiloxane polymer is in the range of about 40 to about 500.

13. The multicomponent network of claim 10, wherein the multicomponent network is an amphiphilic co-network.

14. The multicomponent network of claim 10, wherein the multicomponent network is used to produce a film.

15. A multicomponent network comprising the reaction product of at least one styryl-ditelechelic polyethylene glycol polymer, at least one vinyl ditelechelic polydimethylsiloxane polymer and at least one silane compound according to Formula (I):

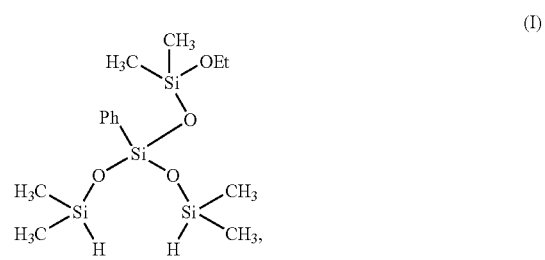
(I)

wherein the silane compound according to Formula (I) can act as both: (1) a chain extender and coupler for the combination of the at least one polyethylene glycol polymer and the at least one polydimethylsiloxane polymer, and (2) as a crosslinking agent compound.

16. The multicomponent network of claim 15, wherein the number of repeating ethylene glycol repeating units in the at least one styryl-ditelechelic polyethylene glycol polymer is in the range of about 40 to about 500.

17. The multicomponent network of claim 15, wherein the number of repeating siloxane repeating units in the at least one vinyl ditelechelic polydimethylsiloxane polymer is in the range of about 40 to about 500.

18. The multicomponent network of claim 15, wherein the multicomponent network is an amphiphilic co-network.

19. The multicomponent network of claim 15, wherein the multicomponent network is used to produce a film.

20. An amphiphilic copolymer network swellable in water and/or n-heptane but insoluble in either, the amphiphilic copolymer network comprising the reaction product of a styryl-ditelechelic polyethylene glycol polymer, a vinyl ditelechelic polydimethylsiloxane polymer and a silane compound according to Formula (I):

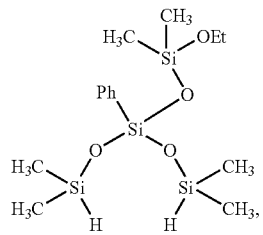
(I)

wherein the silane compound according to Formula (I) can act as both: (1) a chain extender and coupler for the combination of the at least one polyethylene glycol polymer and the at least one polydimethylsiloxane polymer, and (2) as a crosslinking agent compound.

21. The amphiphilic copolymer network of claim 20, wherein the amphiphilic copolymer network is used to produce a film.

22. An amphiphilic network comprising the reaction product of at least one hydrophilic polymer or pre-polymer, at least one hydrophobic polymer or pre-polymer, and at least one silane compound according to Formula (I)

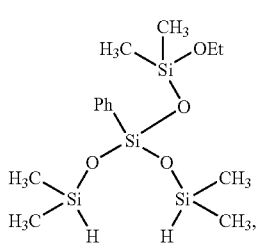

(I)

wherein the silane compound of Formula (I) acts as both:
(1) a chain extender and coupler for the combination of the at least one hydrophilic pre-polymer or polymer and the at least one hydrophobic pre-polymer or polymer, and (2) as a crosslinking agent compound.

23. The amphiphilic copolymer network of claim 22, wherein the amphiphilic copolymer network is used to produce a film.

24. A method for producing a functional multiblock copolymer according to the formula $(AY)_x(BY)_y$, the method comprising the steps of:
(A) combining suitable amounts of an alkylene glycol polymer, a disubstituted siloxane polymer, and a silane chain extending/crosslinking compound;
(B) subjecting the mixture formed in Step (A) to reaction conditions suitable to cause cohydrosilation; and
(C) extracting the reaction product formed in Step (B) to yield a functional multiblock copolymer,
where A represents the alkylene glycol polymer, B represents the disubstituted siloxane polymer, and Y represents the silane compound, and where Y can function as both a chain extender and a crosslinker, and
wherein A is an ethylene glycol polymer according to Formula (II):

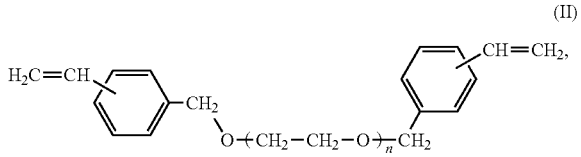

(II)

where n is equal to an integer in the range of about 5 to about 5,000.

25. The method of claim 24, where n is equal to an integer in the range of about 40 to about 500.

26. The method of claim 24, wherein B is a dimethylsiloxane polymer according to Formula (III):

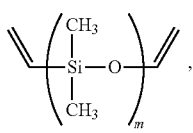

(III)

where m is equal to an integer in the range of about 5 to about 5,000.

27. The method of claim 25, where m is equal to an integer in the range of about 40 to about 500.

28. The method of claim 24, wherein Y is a silane compound according to Formula (I):

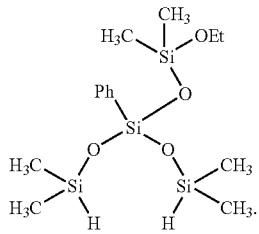

(I)

29. The method of claim 24, wherein the stoichiometry ratio in Step (A) of compound Y to compounds A and B is in the range of about 1.0 to about 1.4 to 1.

30. A method for producing an amphiphilic network, the method comprising the steps of:
(a) combining suitable amounts of at least one functional multiblock copolymer according to the formula $(AY)_x(BY)_y$, where A represents an alkylene glycol polymer, x is selected from an integer in the range of about 5 to about 5,000, B represents a disubstituted siloxane polymer, y is selected from an integer in the range of about 5 to about 5,000, and Y represents a silane compound that functions as both a chain extender and a crosslinker, with at least one acid;
(b) subjecting the mixture formed in Step (a) to reaction conditions suitable to cause crosslinking of the one or more functional multiblock copolymers via compound Y; and
(c) extracting the reaction product formed in Step (b) to yield an amphiphilic network,
wherein A is an ethylene glycol polymer according to Formula (II):

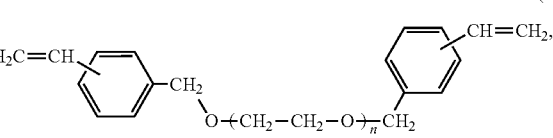

(II)

where n is equal to an integer in the range of about 5 to about 5,000.

31. The method of claim 30, where n is equal to an integer in the range of about 40 to about 500.

32. The method of claim 30, wherein B is a dimethylsiloxane polymer according to Formula (III):

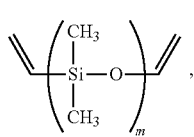

(III)

where m is equal to an integer in the range of about 5 to about 5,000.

33. The method of claim 32, where m is equal to an integer in the range of about 40 to about 500.

34. The method of claim 30, wherein Y is a silane compound according to Formula (I):

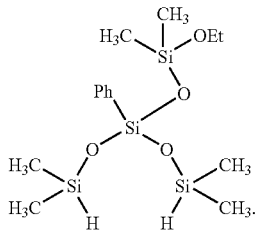

(I)

35. The method of claim 30, wherein Step (b) includes the step of placing the reaction mixture from Step (a) into molds designed to yield film shaped amphiphilic networks.

36. A multiblock copolymer comprising a combination of at least one hydrophilic polymer, at least one hydrophobic polymer and at least one silane compound, wherein the silane compound can act as both: (1) a chain extender and coupler for the combination of the at least one hydrophilic polymer and the at least one hydrophobic polymer, and (2) as a crosslinking agent compound, wherein the at least one silane compound is at least one tri-functional silane compound, and wherein the at least one at least one tri-functional silane compound is a compound according to Formula (I):

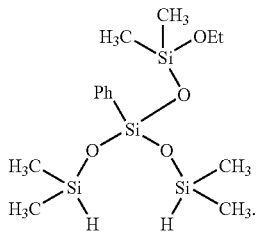

(I)

37. The multiblock copolymer of claim 36, wherein the at least one hydrophilic polymer is selected from at least one polyalkylene glycol polymer.

38. The multiblock copolymer of claim 37, wherein the number of repeating alkylene glycol repeating units in the at least one polyalkylene glycol polymer is in the range of about 5 to about 5,000.

39. The multiblock copolymer of claim 37, wherein the number of repeating alkylene glycol repeating units in the at least one polyalkylene glycol polymer is in the range of about 40 to about 500.

40. The multiblock copolymer of claim 36, wherein the at least one hydrophobic polymer is selected from at least one disubstituted siloxane polymer.

41. The multiblock copolymer of claim 40, wherein the number of repeating siloxane repeating units in the at least one disubstituted siloxane polymer is in the range of about 5 to about 5,000.

42. The multiblock copolymer of claim 40, wherein the number of repeating siloxane repeating units in the at least one disubstituted siloxane polymer is in the range of about 40 to about 500.

43. The multiblock copolymer of claim 36, wherein the multiblock copolymer is a random functional multiblock copolymer according to the formula $(AY)_x(BY)_y$, where A represents the hydrophilic polymer, x is selected from an integer in the range of about 5 to about 5,000, B represents the hydrophobic polymer, y is selected from an integer in the range of about 5 to about 5,000, and Y represents the silane compound.

44. The multiblock copolymer of claim 36, wherein the multiblock copolymer is used to produce an amphiphilic co-network.

45. The multiblock copolymer of claim 36, wherein the multiblock copolymer is used to produce an amphiphilic co-network film.

46. An amphiphilic co-network comprising:

hydrophilic polymer segments formed from at least one hydrophilic polymer containing compound;

hydrophobic polymer segments formed from at least one hydrophobic polymer containing compound; and at least one silane compound, wherein the silane compound acts as both: (1) a chain extender and coupler for the combination of the at least one hydrophilic polymer, and (2) the at least one hydrophobic polymer and as a crosslinking agent compound, and wherein the at least one at least one silane compound is, prior to crosslinking, a tri-functional silane compound according to Formula (I):

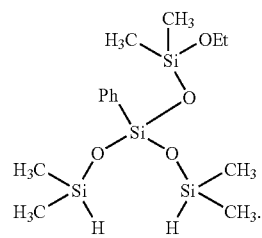

(I)

47. The amphiphilic co-network of claim 46, wherein the at least one hydrophilic polymer is selected from at least one polyalkylene glycol polymer.

48. The amphiphilic co-network of claim 47, wherein the number of repeating alkylene glycol repeating units in the at least one polyalkylene glycol polymer is in the range of about 5 to about 5,000.

49. The amphiphilic co-network of claim 47, wherein the number of repeating alkylene glycol repeating units in the at least one polyalkylene glycol polymer is in the range of about 40 to about 500.

50. The amphiphilic co-network of claim 46, wherein the at least one hydrophobic polymer is selected from at least one disubstituted siloxane polymer.

51. The amphiphilic co-network of claim 50, wherein the number of repeating siloxane repeating units in the at least one disubstituted siloxane polymer is in the range of about 5 to about 5,000.

52. The amphiphilic co-network of claim 50, wherein the number of repeating siloxane repeating units in the at least one disubstituted siloxane polymer is in the range of about 40 to about 500.

53. The amphiphilic co-network of claim 46, wherein the at least one silane compound is at least one tri-functional silane compound.

54. The amphiphilic co-network of claim 46, wherein, after crosslinking, the at least one at least one silane chain extender and crosslinker compound can be represented by the formula shown below:

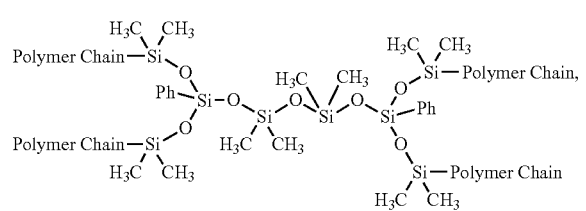
where the words "Polymer Chain" denote bonds that are formed with a suitable hydrophilic polymer or a suitable hydrophobic polymer.
55. The amphiphilic co-network of claim 46, wherein the amphiphilic co-network is in the form of a film.
* * * * *